United States Patent [19]
Parish, Jr. et al.

[11] Patent Number: 6,149,750
[45] Date of Patent: *Nov. 21, 2000

[54] LENS BLANK SURFACE PROTECTION FILM

[75] Inventors: William L. Parish, Jr., Maplewood; Phillip G. Martin, Forest Lake; Patrick D. Hyde, Burnsville, all of Minn.

[73] Assignee: 3M Innovative Properties Company, St. Paul, Minn.

[ * ] Notice: Under 35 U.S.C. 154(b), the term of this patent shall be extended for 500 days.

[21] Appl. No.: 08/560,315

[22] Filed: Nov. 17, 1995

Related U.S. Application Data

[60] Provisional application No. 60/004,120, Sep. 18, 1995.
[51] Int. Cl.⁷ .................................................. B32B 31/00
[52] U.S. Cl. ........................ 156/154; 156/243; 427/208.4; 428/343; 451/42
[58] Field of Search ..................................... 156/154, 243; 428/343; 451/42; 427/208.4

[56] References Cited

U.S. PATENT DOCUMENTS

| | | |
|---|---|---|
| Re. 24,906 | 12/1960 | Ulrich . |
| 3,410,928 | 11/1968 | Baum . |
| 3,786,116 | 1/1974 | Milkovich et al. . |
| 4,174,358 | 11/1979 | Epstein . |
| 4,287,013 | 9/1981 | Ronning . |
| 4,636,427 | 1/1987 | Ohno et al. ............... 428/343 |
| 4,678,836 | 7/1987 | McKinney et al. . |
| 4,737,559 | 4/1988 | Kellen et al. . |
| 4,769,283 | 9/1988 | Sipinen et al. ............ 428/343 |
| 4,833,179 | 5/1989 | Young et al. . |
| 4,847,137 | 7/1989 | Kellen et al. . |
| 4,942,696 | 7/1990 | Winthrop et al. . |
| 4,952,650 | 8/1990 | Young et al. . |
| 5,066,231 | 11/1991 | Oxman et al. . |
| 5,096,969 | 3/1992 | Payne et al. . |
| 5,264,219 | 11/1993 | Godbey et al. . |
| 5,286,781 | 2/1994 | Gotoh et al. . |
| 5,326,413 | 7/1994 | Esemplare et al. . |
| 5,343,657 | 9/1994 | Ohlin ........................... 451/42 |

FOREIGN PATENT DOCUMENTS

| | | |
|---|---|---|
| 0 709 165 A1 | 5/1996 | European Pat. Off. . |
| 59-122570 | 7/1984 | Japan ..................... 156/243 |
| 4-146983 | 5/1992 | Japan . |

OTHER PUBLICATIONS

Patent Abstracts of Japan vol. 16, No. 431, May, 20, 1992.
Textbook of Polymer Science, Fred W. Billmeyer, Jr., Wiley–Interscience, pp. 84–85, 1971.

*Primary Examiner*—John J. Gallagher
*Attorney, Agent, or Firm*—Yen Tong Florczak

[57] ABSTRACT

A conformable tape for bonding a lens block to ophthalmic lens blanks is provided. The tape comprises a polymeric backing and a pressure-sensitive adhesive. In a first preferred embodiment the surface of the backing is a blend of an olefin polymer with a polymer having acidic functionality. The blend may be formed as the backing layer, i.e., directly on the adhesive layer of the tape, or as the outer surface layer of a multilayered backing. In a second embodiment, the surface of the backing is a copolymer of an olefin monomer with a monomer having pendant acidic functionality. A lens block may be adhered to an ophthalmic lens blank by applying a section of the tape described above to an ophthalmic lens so that the pressure sensitive adhesive of the tape contacts the lens; conforming the tape to the compound surface of the lens; and attaching a lens block to at least a portion of the polymer backing layer. The tape may be made by extruding a polymeric backing material as described above; extruding a pressure-sensitive adhesive; and contacting the polymeric backing material and the pressure-sensitive adhesive. If desired, the polymeric backing material and the pressure sensitive adhesive may be coextruded to form the tape. In most preferred embodiments, the tape may be wound into a roll without a separate liner material.

24 Claims, 1 Drawing Sheet

LENS BLANK SURFACE PROTECTION FILM

CROSS-REFERENCE TO RELATED APPLICATION

This application claims priority to U.S. Provisional Patent Application No. 60/004,120, filed Sep. 18, 1995.

FIELD

This invention relates to tapes that have a pressure-sensitive adhesive surface and a separate tack-free adhesion promoting surface. More particularly, it relates to conformable tapes that are employed to adhere fusible metal alloy or thermoplastic blocking compositions to ophthalmic lens blanks. The metal alloy or thermoplastic blocking composition bonds a lens block to the ophthalmic lens blank for use during surfacing (i.e., grinding, fining and polishing) and edging operations.

BACKGROUND

In making finished ophthalmic lenses, particularly prescription lenses for eyeglasses, it is customary to begin with semi-finished lens blanks made from glass or plastic. The blanks have a finished, polished front surface and an unfinished back surface. They are surfaced to a particular prescription by grinding material from the unfinished back surface followed by fining and polishing so that they acquire the optical refractive properties specified in the prescription. The lenses may then be shaped or edged to fit the spectacle frame selected by the wearer.

It is essential that a lens be positioned accurately and held securely during the surfacing and edging operations. However, edge clamping techniques, such as mounting the lens in a vise or in the jaws of a chuck, are unsuitable for holding the lens because material is removed from both its back surface and edges. Thus, it is necessary that the lens be held by an adhesive means which secures it by the finished surface in the appropriate position in the grinding machine. This may be accomplished by "blocking" the lens, e.g., adhering a lens block to the lens by means of a fusible metal alloy or polymeric material.

The alloy or polymeric material is applied in a molten state and subsequently allowed to harden to form a rigid layer of predetermined size and shape that bonds the lens to the lens block. While the alloy conforms well to the front surface of the lens blank, the strength of the bond between the alloy or polymeric material and the lens blank is low. Consequently, primers are needed to obtain adequate bonding between alloy or polymeric material and lens. Primers, however, cause certain problems. For example, they are typically applied from a solution by, for example, brushing or spraying. Consequently the solvent must be allowed to evaporate before the surfacing and edging processes can proceed. This causes inconvenience and delay in processing the lens blanks.

Other techniques of blocking lens blanks have also been tried. Thus, sticky substances, such as pitch or wax, double-sided sticky constructions such as pads or foams coated on each face with adhesive, and epoxy adhesives have been used. These means also have not proven entirely satisfactory. For example, the residue left by pitch, wax, and adhesives require extensive clean-up of both lens and block. This causes delay and added expense in the processing operations. Additionally, these techniques provide less rigid mounting means than do the alloy or polymeric material bonded blocks. Consequently, it is more difficult to assure that the lens will be properly positioned throughout the entire surfacing and edging processes. Additionally, pads or foams are typically opaque so that it is difficult to properly align the lens in the surfacing or edging apparatus. Additionally, the pads and foams are not satisfactorily conformable to the complex curvature of a lens face. Thus wrinkles, folds, air bubbles and other discontinuities between the lens blank and the pad or form are present when they are employed.

A conformable, multi-layered tape for bonding fusible metal alloy to ophthalmic lens blanks is described in U.S. Pat. No. 4,287,013 (Ronning). Unfortunately, the tapes described in this reference generally require fairly complicated processing methods and, as a result, are relatively expensive to produce. In addition, presently available surface protection tapes require a separate liner material to prevent adhesion build-up between the layers of the wound roll of tape. This additional liner material adds undesirably to the total cost of the roll of tape. There is a need for a lens blank surface protection tape that exceeds the performance of the prior tapes and is more cost efficient.

SUMMARY

The present invention overcomes these disadvantages. It provides a tape construction which firmly bonds the lens block to the lens blanks. In a preferred embodiment the tape may be provided in the form of a roll without the need for a separate liner. The tapes are conformable, that is, they follow the curvature of the lens blanks without any wrinkles or air bubbles. Moreover, the tapes are preferably translucent (that is, they permit light to pass therethrough) and more preferably optically clear. As a result, the lens may be visually aligned in the appropriate device prior to blocking. Still further, when tapes of the present invention are removed from the lens they leave virtually no adhesive residue. Thus, messy and time consuming cleaning operations need not be performed on the lens before it can be used. Additionally, the preferred tapes of the invention do not leave any residue on the metal alloy when removed therefrom. Thus, no cleaning is required on the alloy before it can be recycled.

Despite this clean removability, the tapes of the present invention exhibit excellent adhesion to both the lens blank and the alloy. Additionally, the tapes of the invention are able to withstand the shear forces encountered during the surfacing and edging operations. As a result, lenses are held in accurate position throughout these operations.

An added benefit offered by the tape of the present invention is the protection provided to the lenses from thermal and mechanical shock. Thermal protection is particularly important because, in the case of plastic lenses, it is possible for heat distortion to occur in the lens blank when the molten fusible metal alloy makes contact with it. In the completed lens, this distortion will cause aberrations from the desired prescription in those areas where it occurred.

However, when tapes of the present invention are employed, they offer a significant degree of protection from such distortion.

In accordance with the present invention there is provided a conformable tape for bonding a lens block to an ophthalmic lens blank. The tape comprises: a polymer backing having a first major surface of a polymer composition having an olefin moiety and an acid moiety; and a pressure-sensitive adhesive on a second major surface of the polymer backing.

In a first preferred embodiment the polymer backing has a first major surface of a blend of an olefin polymer (e.g., polyethylene (PE), polypropylene (PP), and polybutylene (PB)) with a polymer having acidic functionality (e.g., ethylene acrylic acid (EAA)). The blend may be formed as the backing layer, i.e., directly on the adhesive layer of the tape, or as the outer surface layer of a multilayered backing. Preferred multilayered backings comprise a core layer of a copolymer such as ethylene vinyl acetate (EVA) or nylon. Additional layers, such as "anchoring" layers or "tie" layers, may be used if desired.

In a second embodiment, the polymer backing has a first major surface of a copolymer of an olefin monomer (e.g., propylene, ethylene, butylene, etc.) with a monomer having pendant acidic functionality (e.g., acrylic acid). The copolymer may be formed as the backing layer, i.e., directly on the adhesive layer of the tape, or as the outer surface layer of a multilayered backing.

In a third embodiment, the polymer backing has a first major surface of a blend of a polyamide with the previously mentioned copolymer. The blend preferably has a minor amount of the polyamide and a major amount of the copolymer. The blend may be formed as the backing layer or as the outer surface layer of a multilayered backing.

Suitable conformable tapes of the present invention have a stress retention value, less than about 70% when measured as described in Example 7. This allows the tape to be stretched across and adhered to a curved lens, yet not undesirably rebound towards its planar conformation, thus causing puckering or gaps to form between the tape and the lens, especially at the periphery of the lens.

Also provided herein is a method of adhering a lens block to an ophthalmic lens blank. This method comprises: applying a section of the tape described above to an ophthalmic lens so that the pressure sensitive adhesive of the tape contacts the lens; conforming the tape to the compound surface of the lens so that a surface is provided that is free from wrinkles, air bubbles and other discontinuities in the bond between the tape and the lens blank; and attaching a lens block to at least a portion of the polymer backing layer. The tape backing provides a surface to which the blocking composition or alloy may adhere with sufficient strength to avoid unintended detachment of the lens during processing, yet preferably allows easy deblocking of the lens using, for example, traditional shock deblocking methods. Preferred tapes provide a deblock value of between 5 and 56 cm when measured as described in Example 1.

Also provided herein is a method of making the tape described above. This method comprises the steps of: extruding a polymeric backing material as described above; extruding a pressure-sensitive adhesive; and contacting the polymeric backing material and the pressure-sensitive adhesive to form a conformable tape. If desired, the polymeric backing material or materials and the pressure sensitive adhesive may be coextruded to form the conformable tape. In most preferred embodiments, the tape may be wound into a roll without a separate liner material.

RELATED APPLICATIONS

Of related interest is the following U.S. Provisional Patent Application, filed on Sep. 18, 1995 by the assignee of this invention: Thermoplastic Lens Blocking Composition—Ser. No. 60/003,918, which is herein incorporated by reference.

BRIEF DESCRIPTION OF THE DRAWINGS

These and other features, aspects, and advantages of the present invention will become better understood with regard to the following description, appended claims, and accompanying drawings where:

DEFINITIONS

Figure 1:
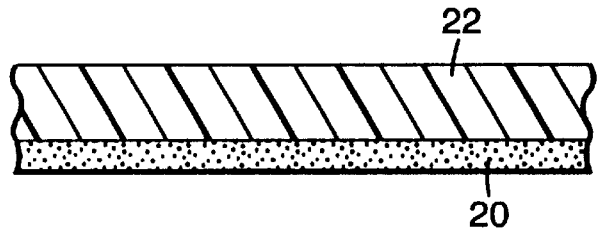
FIG. 1 is a schematic cross-sectional view of a tape of the present invention.

The term "pressure-sensitive adhesive," (PSA) as it is used herein, means a compound or composition that is aggressively and permanently tacky at room temperature, and firmly adheres to a substrate upon mere contact, i.e., without the need of application of more than finger or hand pressure. A "melt-processable" PSA is a PSA that may be directly formed into a sheet, e.g., extruded, without requiring the removal or use of additional processing aid such as a solvent.

The term "blocking" is used in two different contexts in this specification. When used in the context of a wound roll of adhesive tape, "blocking" means the build-up of adhesion between the layers of the tape such that the roll can no longer be unwound. The term "antiblocking agent," as it is used herein in the context of a roll of adhesive tape, means an agent that prevents or inhibits the build-up of adhesion between the layers of the tape such that the roll can no longer be unwound.

A "polymer" is a macromolecule formed by the chemical union of two or more monomers. A "copolymer" is a macromolecule formed by the chemical union of two or more different monomers.

An "olefin" polymer or a "polyolefin" is a polymer or copolymer comprising alkene or "olefin" monomers. Examples of alpha-olefin comonomers include ethylene, propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. Polymers containing substituent groups are also included in this definition.

An "acid" moiety or "material containing an acid functionality" includes organic acids such as carboxylic acids, sulfonic acids, phosphonic acids, etc., as well as a precursor to the acid such as an acid anhydride or ester.

An "ionomer" resin is a copolymer that contains an acid group and which has been preferably doped with a metallic compound such as zinc or sodium. Examples of ionomer resins are ionomer copolymers of ethylene and a vinyl monomer having an acid group, such as acrylic acid or methacrylic acid, with zinc or sodium ions (such as the "SURLYN" polymers manufactured by the DuPont Co. of Wilmington, Del.). Additional ionomer resins are disclosed in U.S. patent application Ser. No. 08/503,537, which is herein incorporated by reference.

"Linear low density polyethylene" (LLDPE) is a term applied to ethylene copolymers produced using a coordination catalyst, the chain-structure of the polymer molecules being substantially linear, as opposed to molecules having branches or side-chains of polymerized monomer units. In LLDPE, the pendant groups along the chain are essentially attributable to olefin comonomer moieties (other than ethylene) which have had their olefin groups polymerized directly into the polymer chain along with the copolymerized ethylene groups. A pronounced effect of the copolymerized olefin comonomers is that the density of the linear polymer is decreased, yet the molecule structure remains substantially linear. These LLDPE polymers are "random copolymers," as opposed to "block copolymers" or "graft copolymers". The density of LLDPE polymers is usually in the range of about 0.915 to 0.94 gm/cc.

"High density polyethylene" (HDPE) is a term applied to ethylene polymers ordinarily produced using a coordination catalyst. Its high density (generally in the range of about 0.94 to 0.98 gm/cc) is generally attributed to the fact that there is a substantial absence of side-chains or pendant groups. Coordination catalysts include, principally, the well-known Ziegler catalysts, Natta catalysts, Ziegler-Natta catalysts, the Phillips chromium oxide catalyst, and varieties of these.

"Low density polyethylene" (LDPE) is a term applied to ethylene polymers ordinarily prepared using a free-radical initiator (such as peroxides, oxygen, air) in high pressure equipment. Historically the term "ICI-type polyethylene" has been used by many practitioners to denote polyethylene made in a high pressure, free-radical process. The density of these LDPE polymers (usually in the range of about 0.91–0.935 gm/cc) is generally attributed to the inherent presence of polymer side-chains. They are generally referred to as branched polyethylene in contradistinction to linear polyethylene.

"Very low density polyethylene" (VLDPE) is a term applied to ethylene polymers ordinarily prepared using above-conventional amounts of higher alpha olefin comonomer (e.g., butene, hexene, and octene). The density of these VLDPE polymers is usually in the range of about 0.88 to 0.915 gm/cc.

DETAILED DESCRIPTION

The tapes of the present invention conform to, that is replicate, the contour of the lens blank while withstanding the shear forces encountered during the surfacing and edging steps.

The tape preferably comprises a polymer backing having a first major surface of a polymer composition having an olefin moiety and an acid moiety; and a layer of a pressure-sensitive adhesive on a second major surface of the polymer backing. During use, the pressure sensitive adhesive side of the tape is joined to the ophthalmic lens while the backing layer is joined to the metal alloy or thermoplastic blocking composition.

In a first preferred embodiment the polymer backing has a first major surface of a blend of an olefin polymer (e.g., polyethylene (PE), polypropylene (PP), and polybutylene (PB)) with a copolymer having pendent acidic functionality (e.g., ethylene acrylic acid (EAA)). The blend may be formed as the backing layer, i.e., directly on the adhesive layer of the tape, or as the outer surface layer (or "skin" layer) of a multilayered backing.

In a second embodiment, the polymer backing has a first major surface of a copolymer of an olefin monomer (e.g., propylene, ethylene, butylene, etc.) with a monomer having pendant acidic functionality (e.g., acrylic acid). In a third embodiment, the polymer backing has a first major surface of a blend of a polyamide with the previously mentioned copolymer. The copolymer (or copolymer/polyamide blend) may be formed as the backing layer, i.e., directly on the adhesive layer of the tape, or as the outer surface layer (or "skin" layer) of a multilayered backing.

Preferred tapes may be wound into a roll without the need for a separate liner. The force needed to unwind a roll of tape preferably is less than 250 g/cm width, when tested as described in Example 4, more preferably less than 220 g/cm width, most preferably less than 180 g/cm width, and optimally less than 164 g/cm width. The force needed to unwind a roll of tape which has been stored for at least 99 days (as described in Example 4) is most preferably less than 200 g/cm width, and optimally less than 180 g/cm width.

Suitable conformable tapes of the present invention have a stress retention value less than about 70% when measured as described in Example 7. This allows the tape to be stretched across and adhered to a curved lens, yet not undesirably rebound towards its planar conformation, thus causing puckering or gaps to form between the tape and the lens, especially at the periphery of the lens. Preferred tapes of the present invention have a stress retention less than about 67%, more preferably less than about 65% and most preferably less than about 60%.

Preferred conformable tapes exhibit edge lift of less than 12 mm, when tested as described in Example 7 using a Signet Armorlite lens having a base curvature of 8.25. More preferred tapes exhibit edge lift less than about 10 mm, most preferred tapes exhibit edge lift less than about 9 mm, and optimum tapes exhibit edge lift less than about 8 mm, when tested in this manner.

The polymer backing is preferably non-tacky to the touch. As a result, lens blanks which have had the tape applied thereto are easy to handle. The polymer backing of the tape exhibits conformability when the tape is applied to compound lens surfaces (i.e., it generally assumes the shape of the surface without wrinkles or air bubbles). Additionally, it exhibits sufficient strength to withstand breaking when applied to the compound surfaces.

A variety of materials are useful in forming the polymer backing. At least the outer surface of the polymer backing should comprise an olefin moiety and an acid moiety. The polymer backing may optionally comprise layers of materials that do not comprise an olefin moiety and an acid moiety.

As previously mentioned, the polymer backing may comprise an outer surface layer of a blend of an olefin polymer with a polymer that comprises acidic functionality (including polymers having an acid precursor such as an anhydride). Examples of useful polyolefin materials for this blend include polyethylene (e.g., very low, linear low, low, and medium density polyethylene), copolymers of ethylene with octene, chlorinated polyethylene, copolymers of ethylene with vinyl acetate, copolymers of ethylene with ethyl acrylate, oriented and unoriented polypropylene, and olefinic ionomer resins such as "SURLYN" resins from E. I. Du Pont de Nemours and Company, Wilmington, Del. Examples of useful polymers comprising acidic functionality for this blend include copolymers of an olefin monomer (e.g., ethylene) and acrylic acid, copolymers of ethylene and methacrylic acid, and the like. "PRIMACOR" polymers from Dow Chemical Co., Midland, Mich. are presently preferred. Suitable ethylene/acrylic acid copolymers used in the present invention are generally characterized as a random copolymer prepared at high pressure by the action of a free-radical polymerization initiator, acting on a mixture of ethylene and acrylic acid monomers. Suitable copolymers contain about 0.5 to about 25 weight percent of the acrylic acid moiety, and preferred copolymers contain about 1 to about 10 weight percent of the acrylic acid moiety.

Suitable ethylene-acrylic acid copolymer/linear low density polyethylene blends comprise from about 1 percent by weight to about 80 percent by weight of linear low density ethylene copolymer. Preferably, the blend comprises from about 20 percent by weight to about 95 percent by weight of an ethylene-acrylic acid copolymer and from about 5 percent by weight to about 80 percent by weight of linear low density ethylene copolymer. More preferably, the blend comprises from about 25 percent by weight to about 85 percent by weight of an ethylene-acrylic acid copolymer and from about 15 percent by weight to about 75 percent by weight of linear low density ethylene copolymer. Most preferably, the blend comprises from about 30 percent by weight to about 50 percent by weight of an ethylene-acrylic acid copolymer and from about 50 percent by weight to about 70 percent by weight of linear low density ethylene copolymer.

As previously mentioned, the polymer backing may comprise an outer surface layer of a copolymer of an olefin monomer with a monomer that comprises acidic functionality. Examples of useful olefin monomers for this copolymer include ethylene, propylene, butylene, etc. Examples of suitable monomers having pendant acidic functionality include acrylic acid, methacrylic acid, and acid precursor monomers such as maleic anhydride. The copolymer may be formed as the backing layer, i.e., directly on the adhesive layer of the tape, or as the outer surface layer (or "skin" layer) of a multilayered backing. Preferred copolymers include ethylene acrylic acid copolymers. The copolymer may be blended, if desired, with a polyamide. Preferred backings of this embodiment comprise a minor amount of polyamide. More preferred backings of this embodiment comprise less than about 5% polyamide. Most preferably the polyamide is nylon.

The tapes of the present invention may also include additional "core" layers of materials (including layers of materials that do not comprise an olefin moiety and an acid moiety) between the outer surface layer and the pressure sensitive adhesive layer. Examples of useful materials for the optional core layers include: the polyolefins mentioned above, ethylene vinyl acetate copolymers; ethylene methylacrylate copolymers; ethylene ethylacrylate copolymers; ethylene acrylic acid copolymers; vinyl polymers (e.g., polyvinyl chloride); urethane polymers (e.g., polyester urethanes and polyether urethanes); polyester films (e.g., poly (ethylene terephthalate)); ionomer polymers; maleic anhydride/acrylic acid graft copolymers with ethylene vinyl acetate copolymer, ethyl acrylate, polyethylene, or polypropylene such as "BYNEL" resins from E. I. Du Pont de Nemours and Company; and polyamide films (e.g., nylon). Preferred multilayered backings comprise a core layer of a material such as ethylene vinyl acetate (EVA) or nylon between the first surface layer (or "skin" layer) and the adhesive layer. Laminated constructions of two or more of these materials may be employed with the surface skin layer as the backing layer if desired.

The core layer should be selected so as to provide a tape with the desired conformability. In addition, the core layer should optimally provide a surface that retains the adhesive layer, i.e., inhibits adhesive transfer to the lens blank.

Additional layers, such as "anchoring" layers or "tie" layers, may be used if desired, e.g., to join the backing to the adhesive layer.

The total thickness of the polymer backing (including any core or skin layers or coating applied thereto, but not including the adhesive layer of the tape) is preferably between about 0.01 and 0.25 mm, more preferably between about 0.03 and 0.15 mm, most preferably between 0.05 and 0.1 mm.

A wide variety of adhesives may be used when forming the tapes of the present invention. Most preferably, the adhesive is a pressure sensitive adhesive. Suitable pressure-sensitive adhesive employed in the present invention exhibit high bond strength to the ophthalmic lens (e.g., plastic and glass). They also exhibit high cohesive strength and high bond strength to the backing layer. Preferably, they leave virtually no adhesive residue when removed from the lens.

The amount of adhesive present on the backing layer should be sufficient to hold the tape on the lens during the surfacing and generating process. It has been found preferable that the amount of adhesive present be in the range of about 7 $g/m^2$ to 80 $g/m^2$. More preferably, the amount of adhesive present is in the range of about 15 $g/m^2$ to 75 $g/m^2$; most preferably, the amount of adhesive present is in the range of about 15 $g/m^2$ to 70 $g/m^2$; and optimally, it is in the range of about 19 $g/m^2$ to 65 $g/m^2$.

A variety of pressure-sensitive adhesives are useful. They include polyacrylate adhesives, natural rubber adhesives, thermoplastic rubber adhesives, and blends thereof. Preferably the adhesive is a polyacrylate adhesive.

In one presently preferred embodiment, a layer of pressure sensitive adhesive is coextruded with the backing to form the tape. Suitable "coextrudable" or "melt-processable" pressure sensitive adhesives include those adhesive disclosed in U.S. Pat. Nos. 4,737,559 and 4,847,137, and in U.S. patent application Ser. No. 08/390,780, which are herein incorporated by reference.

Examples of suitable melt-processable adhesives include crosslinked pressure-sensitive adhesives comprising a crosslinked copolymer comprised of A monomers, PX monomers, and optional B monomers wherein:

A is a monomeric acrylate or methacrylate ester of a non-tertiary alcohol or a mixture of non-tertiary alcohols, the alcohols having from 1 to 14 carbon atoms with the average number of carbon atoms being about 4–12;

PX is a copolymerizable mono-ethylenically unsaturated aromatic ketone monomer free of ortho-aromatic hydroxyl groups; the copolymer being crosslinked by means of the PX monomer and the degree of crosslinking and the degree of polymerization of the copolymer being such that the crosslinked pressure-sensitive adhesive composition preferably has a creep compliance value (hereinafter J-value) of at least about $1.2 \times 10^{-5}$ cm$^2$/dyne; and B is an ethylenically unsaturated compound copolymerizable with the A and/or PX monomers.

Use of the PX monomer to crosslink the copolymer allows for control of the creep compliance of the adhesive. Copolymerizing the PX monomer into the backbone of the pressure-sensitive adhesive copolymer also allows for crosslinking of the copolymer with ultra-violet or actinic radiation after formation of the copolymer. Further, copolymerizing the PX monomer into the polymer backbone before the crosslinking thereof greatly increases the efficiency of the crosslining obtainable by inclusion of the PX monomer in the adhesive as compared with addition of an aromatic ketone compound which is not initially copolymerized into the copolymer. Because of the increased efficiency, only small amounts of PX monomer are needed to achieve useful degrees of crosslinking.

The number and composition of A, PX and B monomers and the degree of polymerization of the copolymer are preferably adjusted to obtain the desired physical properties of the adhesive (e.g., the desired degree of creep compliance). For a polymer having a given A and B composition, an increase in the amount of PX monomer will generally result in an increase in the degree of photo-crosslinking and decrease the level of creep compliance of the copolymer. Likewise, an increase in the degree of polymerization of the copolymer will decrease the level of creep compliance of the adhesive. Accordingly, as the amount of PX monomer is increased and, as a result, the degree of photocrosslinking is increased, the degree of polymerization of the copolymer adhesive should be decreased to obtain a comparable level of creep compliance. Conversely, if the amount of PX monomer is decreased, and, as a result, the degree of photocrosslinking is decreased, the degree of polymerization of the uncrosslinked copolymer adhesive should be increased to obtain a comparable level of creep compliance when crosslinked. For example, a preferred composition of the copolymer adhesive is 94 parts isooctyl acrylate, 0.4 parts para-acryloxy benzophenone and 6 parts acrylic acid ("94/0.4/6"). For this particular composition, the inherent viscosity, which is a measure of the degree of polymerization of the resulting copolymer before crosslinking should be from about 1 to about 1.7 dl/g. Another presently preferred composition of the copolymer adhesive comprises a blend of 80 parts of the 94/0.4/6 adhesive with 20 parts of a copolymer adhesive that is 90 parts isooctyl acrylate, 0.2 parts para-acryloxy benzophenone and 10 parts acrylic acid ("90/0.2/10"). The 90/0.2/10 component generally has a relatively low inherent viscosity (~0.5 dl/g). This blend exhibits excellent adhesion to glass substrates.

To obtain the desired physical properties, the weight of PX monomer is generally within the range of about 0.01% to about 2%, preferably about 0.025% to about 0.5% of the total weight of all monomers in the copolymer.

In general, the inherent viscosity of the uncrosslinked copolymer should range from about 0.5 to about 2.0 dl/g, more preferably from about 0.8 to 1.6 to obtain the desired degree of polymerization of the copolymer. The test procedure followed and the apparatus that can be used to measure inherent viscosity are described in detail in "Textbook of Polymer Science", F. W. Billmeyer, Wiley-Interscience, Second Edition, 1971, pages 84 and 85.

Monomer A is a monomer which contributes to the visco-elastic properties of the copolymer. Monomer A preferably is a monomeric acrylic or methacrylic acid ester of a non-tertiary alcohol or a mixture of non-tertiary alcohols, the alcohols having from 1 to 14 carbon atoms with the average number of carbon atoms being about 4–12. Examples of such monomers include the esters of acrylic acid or methacrylic acid with non-tertiary alkyl alcohols such as 1-butanol, 1-pentanol, 2-pentanol. 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like. Such monomeric acrylic or methacrylic esters are known in the art and many are commercially available.

The PX monomer is a copolymerizable monoethylenically unsaturated aromatic ketone compound free of ortho-aromatic hydroxyl groups, wherein only the ethylenically unsaturated group is copolymerizable with the A monomers and optional B monomers under the polymerization conditions selected to form the copolymer.

Aromatic ketones free of ortho-aromatic hydroxyl groups absorb ultraviolet radiation to form a triplet excited state through intersystem crossing. These excited state molecules can abstract hydrogen radicals from the polymer. The free radical sites thus generated on the polymer can combine to form crosslinks. The semi-pinacol radical which results from the combination of the photocrosslinker (PX) and the hydrogen radical can also lead to crosslinking since the photocrosslinker is copolymerized. The presence of a hydroxyl groups as ring substituent in a position ortho to the carbonyl on the aromatic ring will inhibit the crosslinking ability of the aromatic ketone monomer. Accordingly, the aromatic-ketone monomer is preferably free of ortho-aromatic hydroxyl groups.

Preferred PX monomers are represented by the general formula:

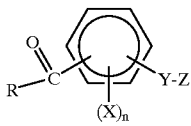

wherein

R is lower alkyl or phenyl, provided that R may be substituted with one or more halogen atoms, alkoxy groups, or hydroxyl groups, and further provided that when R is phenyl substituted with one or more hydroxyl groups, any such hydroxyl groups must be meta or para to the aromatic carbonyl;

X is halogen, alkoxy, or hydroxyl, provided that when an X is a hydroxyl groups, X must be meta or para to the aromatic carbonyl;

n is an integer from 0 to 4;

Y is a divalent linking group, preferably selected from the group consisting of a covalent bond, an oxygen atom (—O—), an amino groups (—NR'— wherein R is hydrogen or lower alkyl), an oxyalkyleneoxy group (—O—R"—O— wherein R" is an alkylene group), a carbamoylalkyleneoxy group (—O—R"—O—C(O)—N—(R')—R"'— wherein R"' is a covalent bond or an alkyleneoxy group such as —R"—O— wherein R" is an alkylene group); and Z is alkenyl or ethylenically unsaturated acyl.

Particularly preferred PX monomers are the acryloxybenzophenones, e.g., para-acryloxybenzophenone.

The optional B monomer is an ethylenically unsaturated compound copolymerizable with the monomeric acrylic acid ester and is employed to modify the physical properties of the copolymer. In general, the addition of the B monomer will reduce the flexibility of the copolymer. Preferred B monomers are acrylic acid, methacrylic acid, itaconic acid, acrylamide, methacrylamide, acrylonitrile, methacrylonitrile, vinyl acetate, and N-vinylpyrrolidone. The B monomer may be included at levels up to 25% of the total weight of all monomers. The preferred adhesive according to the present invention will contain from about 1% to about 15% by weight of B monomer of the total weight of all monomers. In a preferred adhesive, the amount of acrylic acid or acrylamide will range from about 1% to about 7% by weight of total monomer. In adhesives containing N-vinylpyrrolidone as the B monomer, the preferred copolymer will contain from about 5% to about 15% of N-vinylpyrrolidone by weight.

The A monomer, PX monomer, and optional B monomer may be dissolved in a suitable inert organic solvent and polymerized by standard free radical polymerization utilizing a suitable free radical initiator such as those described U.S. Pat. No. RE 24,906 (Ulrich). Suitable initiators which may be utilized include azo compounds such as 2,2'-azobis(isobutyronitrile), hydroperoxides such as tert-butyl hydroperoxide, peroxides such as benzoyl peroxide or cyclohexanone peroxide. Generally, from about 0.01% to about 1% by weight of thermally activatable initiator based upon the total polymerizable composition is used, preferably 0.01% to 0.5%.

The organic solvent utilized in the free radical polymerization may be any organic liquid which is a solvent for the reactants and product, that is inert to the reactants and product, and will not otherwise adversely affect the reaction. Suitable solvents include ethyl acetate and mixtures such as ethyl acetate with toluene, heptane and toluene and isopropyl alcohol and heptane with toluene and methyl alcohol. Other solvent systems are useful. The amount of solvent is generally about 30–80% by weight based on the total weight of the reactants and solvent. Copolymerization may be carried out by other well known techniques such as suspension, emulsion or bulk polymerization.

The uncrosslinked copolymer is easily coated or coextruded upon suitable backings. After the adhesive has been coated or coextruded, it may be subjected to ultraviolet radiation of sufficient intensity for a time sufficient to crosslink the copolymer to the desired degree by means of the aromatic ketone groups of the PX monomer. The degree of crosslinking by means of the PX monomer is controlled by the amount of PX monomer in the copolymer and the intensity of the crosslinking radiation to which the uncrosslinked copolymer radiation to which the uncrosslinked copolymer is exposed during the method of preparing an adhesive of this invention.

To measure the creep compliance of this adhesive, a 150-micrometer thickness of the adhesive is knife-coated onto a smooth film of polytetrafluoroethylene. The coated film is then dried to constant weight by placing it in an air-circulating oven generally for at least five minutes at 110° C. The adhesive, thus dried, is stripped from the polytetrafluoroethylene and two test pieces of equal area are die-cut and placed in a parallel plate creep compliance rheometer, one piece being on each side of the center plate, with an outer plate contacting the exposed surface of each. Screws which connect the two outer plates are then tightened so as to compress the interposed layers of adhesive approximately 10%. The parallel plates are placed in horizontal arrangement and one end of the center plate is connected to a chart recorder. A hook is attached to the opposite end of the center plate with a flexible wire extending horizontally from the hook and then downward over a pulley, the outer plates being held in a fixed position. A suitable weight (one sufficient to measurably deform the sample a distance no greater than its thickness) is attached to the free end of the wire, then the strip chart recorder is started. The weight typically used to exert the stress on the adhesive films is 500 grams. From the strip chart recorder, the time and the displacement (strain) are read and the applied force (stress) is recorded. The creep compliance at a given temperature is then calculated using the equation:

$$J_{(t)}=2AX/hf$$

where t is the time at which the measurement is taken, A is the area of one face of the adhesive samples, h is the thickness of the adhesive mass, X is the displacement at time t (where X is less than h) and f is the force due to the mass attached to the wire connected to the middle plate. Where A is expressed in $cm^2$, h in cm, X in cm, and f in dynes, the compliance value $J_{(t)}$ is given in $cm^2/dyne$.

It has been found that the adhesive films of this embodiment of the invention have the required degree of compliance and the short term creep to function as an exceptionally fine pressure sensitive adhesive when the J value measured at ambient conditions at the end of a 3 minute period of subjection to stress is at least about $1.2 \times 10^{-5}$ cm$^2$/dyne to about $2.3 \times 10^{-5}$ cm$^2$/dyne, preferably about $1.3 \times 10^{-5}$ cm$^2$/dyne to about $2.0 \times 10^{-5}$ cm$^2$/dyne.

In a second embodiment, the adhesive comprises a co-extrudable adhesive such as are disclosed in U.S. Pat. Nos. 4,833,179 and 4,952,650, which are herein incorporated by reference. These suitable coextrudable adhesives may be made by the suspension polymerization of a pressure-sensitive acrylate copolymer bead having a glass transition temperature of 0° C. or less. This method comprises the steps of.

(a) making a monomer premix comprising
  (i) an acrylic acid ester of a non-tertiary alcohol, the alcohol having from 1 to 14 carbon atoms, with the average number of carbon atoms being about 4 to about 12,
  (ii) a polar monomer copolymerizable with the acrylic acid ester,
  (iii) a chain transfer agent,
  (iv) a free-radical initiator, and
  (v) a modifier moiety;
(b) combining the premix with a water phase containing a suspending agent to form a suspension;
(c) concurrently agitating the suspension and permitting polymerization of the monomer premix until polymer beads are formed; and
(d) collecting the polymer beads, whereby the amount of the modifier moiety is sufficient to render wet copolymer beads non-agglomerating at room temperature to be safely handleable and transportable. The modified moiety is preferably selected from the group consisting of polystyryl macromers, reactive zinc salts and hydrophobic silica. Certain zinc salts and the hydrophobic silica may be added after polymerization has begun, if desired.

Suitable alkyl acrylate monomers useful in this embodiment of the present invention include monofunctional unsaturated acrylate ester monomers. Included within this class of monomers are, for example, isooctyl acrylate, isononyl acrylate, 2-ethyl-hexyl acrylate, decyl acrylate, dodecyl acrylate, n-butyl acrylate and hexyl acrylate. Preferred monomers include isooctyl acrylate, isononyl acrylate, and butyl acrylate. Acrylate monomers preferably comprise at least about 80 parts based on 100 parts total monomer content, preferably from about 85 parts to about 95 parts.

Polar monomers useful in this embodiment of the invention include both moderately polar and strongly polar monomers. Strongly polar monomers useful herein include acrylic acid, methacrylic acid, itaconic acid, hydroxyalkyl acrylates, styrene sulfonic acid or the sodium salt thereof, maleic acid, fumaric acid, citraconic acid, acrylamides, and substituted acrylamides. Moderately polar monomers useful herein include N-vinyl lactams such as N-vinyl pyrrolidone, N-vinyl caprolactam, acrylonitrile, dimethyl amino-propyl methacrylate, and vinyl chloride. Preferred polar monomers include acrylic acid, methacrylic acid, acrylamides and substituted acrylamides. Polar monomers preferably comprise up to about 20 parts based on the total monomer content.

Modifier moieties useful in the method of the present invention include polystyryl methacrylate macromolecular monomers (macromers), zinc oxide or reactive zinc salts, and hydrophobic silica. Preferred moieties include the reactive zinc salts, and the macromers. A variety of useful macromers and methods for their preparation are disclosed in U.S. Pat. No. 3,786,116, which is herein incorporated by reference. A particularly useful 1-polystyrylethyl methacrylate macromonomer is commercially available under the name Chemlink 4500™. This macromer is a high glass transition temperature ($T_g$) polymeric material, having a $T_g$ of about 90° C. or higher, and a molecular weight of from about 5,000 to about 25,000. The modifier moiety is suitably present in an amount ranging from about 0.05 to about 10 parts based on 100 parts total monomer content. The preferred level of modifier moiety varies with the selection of the moiety, i.e., a preferred level of macromer ranges from 0.5 to about 10 parts based on 100 parts monomer content. The macromer is added to the monomer premix. The reactive zinc salts and/or hydrophobic silica may be added to the monomer premix, alternatively, they may be added to the suspension during polymerization.

The copolymer beads of this embodiment are prepared by an aqueous suspension polymerization technique utilizing conventional suspension agents with optional anionic surfactants. The amount of surfactant is preferably from about 2.5 ppm to about 1.0 part based on 100 parts total monomer content. Preferred surfactants include sodium lauryl sulfate and sodium dioctyl sulfosuccinate. Non-ionic surfactants may also be included so long as an anionic surfactant is present and predominates.

Suspending agents are those conventionally used in suspension polymerization processes. They may be minimally water-soluble inorganic salts such as tribasic calcium phosphate, calcium carbonate, calcium sulfate, barium sulfate, barium phosphate, hydrophilic silicas, and magnesium carbonate. Preferred inorganic suspending agents include barium sulfate, hydrophilic silicas, and tribasic calcium phosphate. Water-soluble organic suspending agents may also be used, e.g., polyvinyl alcohol, poly-N-vinyl pyrrolidone, polyacrylic acid, polyacrylamide and hydroxyalkyl cellulose. The suspending agent is present in amounts ranging from about 0.01 part to about 5 parts based on 100 parts total monomer content.

Initiators for polymerizing the monomers to provide the copolymer beads of the invention are those which are normally suitable for free-radical polymerization of acrylate monomers and which are oil-soluble and have low solubility in water, e.g., organic peroxides such as benzoyl peroxide, lauryl peroxide and various thermal initiators. Preferred thermal initiators include 2,2'-azobisbutryronitrile, commercially available from E. I. DuPont de Nemours under the trade name Vazo™ 64. The initiator is present in an amount from about 0.05 to about 1 part based on 100 parts total monomer content.

Useful chain transfer agents include mercaptans, alcohols, and carbon tetrabromide. Isooctyl thioglycolate and carbon tetrabromide are preferred. The chain transfer agent is present in any amount of from about 0.01 to about 0.5 part based on 100 parts total monomer content.

Photocrosslinking agents may also be used in methods of the invention. Preferred crosslinking agents include copolymerizable aromatic ketone monomers, especially acryloxybenzophenone. When present, the photocrosslinker generally comprises from about 0.01 to about 5.0 parts based on 100 parts total monomer weight.

The monomers, modifier moiety, chain transfer agent, free-radical initiator, and any optional materials are mixed together in the prescribed ratio to form a monomer premix. They are then combined with a water phase comprising a suspending agent, any optional surfactant and water, and are polymerized with agitation for from about 2 to about 16 hours at a temperature of from about 40° C. to about 90° C. to give a suspension which contains the copolymer beads. The beads are then washed and separated from the water by means such as gravity filtration. The filtered product also generally comprises about 15–30% water.

In yet a further embodiment, the adhesive layer alternatively may be coated onto the backing (e.g., using a conventional coating process) or transferred onto the backing (e.g., in the form of a transfer adhesive or a double-sided adhesive tape). Suitable transfer adhesives include 3M Transfer Adhesive No. 1524 from 3M, St. Paul, Minn. or the like.

Suitable coatable pressure sensitive adhesives include adhesives that comprise a polymer of an acrylate ester of acrylic acid with a non-tertiary alcohol. These adhesives also preferably contain a minor amount of a copolymerized acid or amide. These adhesives and methods of their preparation are described in U.S. Pat. No. RE 24,906 which is herein incorporated by reference. An example of a useful pressure-sensitive adhesive of this type comprises a polymer of 90 parts by weight isooctyl acrylate and 10 parts by weight acrylic acid available as Y 9460 from 3M Company.

Also useful are natural rubber adhesives comprising natural rubber and, preferably, a tackifying resin. One such adhesive comprises natural pale crepe rubber (100 parts by weight), polyterpene resin (75 parts by weight), and antioxidant (1 part by weight). Other useful natural rubber adhesives are also useful and will be apparent to those skilled in the art.

In addition, thermoplastic rubbery adhesives comprising a rubbery block copolymer and, preferably, at least one resin compatible with the block copolymer are useful. The rubbery copolymers have the general configuration A-B-A wherein the A units represent a thermoplastic polymer block with a $T_g$ above 20° C. and the B units represent an elastomeric polymer block formed from a conjugated diene. The A units are relatively incompatible with the B units and have an average molecular weight of from about 5,000 to 125,000. Preferably the A units are styrene and the B units are polybutadiene or polyisoprene or poly(ethylene/butylene). An example of block copolymer of this type is Shell Chemical Company Kraton D1101. Other block copolymers of this type may also be used. Resins compatible with the block copolymer are known and include, for example, hydrocarbon resins, coumarone-indene resins, dimerized rosins, metal resinates, hydrogenated rosins, polyterpene resins and heat treated wood rosins.

The blocking composition should preferably adhere to the tape applied to the lens blank with a sufficient strength to avoid unintended detachment of the lens during processing, yet preferably allow deblocking of the lens using traditional shock deblocking or hot-water deblocking methods. Thus, a preferred balance of adhesion should be achieved.

One method of assessing whether a particular tape achieves the necessary balance of adhesion between the blocking composition and the lens blank is to perform a shock "deblocking" test using a standard commercial lens block. For this test, a 70 mm plastic lens (a 2.0–2.4 mm center thickness, plano, finished uncut, "RLX Plus™ Scratch Resistant, Finished Lens in Hard Resin" from Signet Armorlite, Inc.) is covered with a surface protective tape. A brass blocking ring is placed on a blocker (e.g., OPTEK™ Model 200 Blocker) and a 56 mm diameter Coburn Block from Coburn Company is placed into the ring such that the inlet in the block fits snugly over the rubber nozzle. The block is then centered on the lens and slowly filled with molten blocking composition. The blocked lens assembly is allowed to set for 10 to 15 seconds after filling, in order for the blocking composition to harden and form a good bond to the taped lens. The blocking ring and blocked lens are removed from the blocker and the blocked lens is removed from the blocking ring. The blocked lens is then allowed to set for 1 hour before deblocking. The blocked lens is placed into the deblocking ring and the lens is taped to the deblocking ring using 1.27 cm wide filament tape. With the blocking tool facing downward, the blocked lens is placed in a hollow tube. The diameter of the tube is much greater than the blocking tool and the tube is sufficiently thick to abruptly stop the lens by its perimeter. The blocked lens assembly is dropped starting at 2.54 cm height and raised in 2.54 cm increments until the block separated from the tape or until 15.24 cm in height, then, raised and dropped in 5.08 cm increments up to 91.44 cm. The height in centimeters at which the block released from the tape is recorded as the deblock value. Using this method, preferred tapes have a deblock value of between 5 and 56 cm, more preferably between 7 and 45 cm, most preferably between about 10 and 35 cm, and optimally between about 14 and 20 cm.

The polymer backing of the present invention may contain a variety of additional ingredients. Thus, they may be modified by the incorporation of modifying agents that increase flexibility and/or clarity (e.g., nucleating agents), fillers, antiblocking agents, and the like. Fillers and antiblocking agents are useful in reducing blocking to other surfaces. Materials useful as fillers and antiblocking agents are well known in the art. If desired, low adhesion backsizes (LAB) may be used as an antiblocking agent. However, the selection of the LAB should be made so as to not interfere with the desired level of adhesion between the tape backing and the blocking composition. Presently preferred tapes do not contain a LAB.

Other layers and ingredients may be employed in the tapes of the present invention. For example, an anchoring layer may be employed between the backing layer and the pressure-sensitive adhesive in order to improve the bond therebetween. The anchoring layer can be selected from a variety of materials commonly employed for improving bonds between substrates.

It has been found that colorants (e.g., dyes and pigments) are useful in the tapes of the present invention to enhance the visibility of the tapes once they have been applied to the ophthalmic lens blanks. Preferably they do not render the tapes opaque. Typically, they are included in the backing layer. They may also be included within the pressure-sensitive adhesive. Typically they comprise up to about 10% by weight of whatever layer they are in. The colorants are preferably pigments. A particularly useful pigment and concentration is copper phthalocyanine present in an amount in the range of 2 to 7 parts by weight.

The tapes of the present invention may be readily prepared from known processing techniques. Thus, for example, the pressure-sensitive adhesive may be applied by solution coating the appropriate adhesive onto the backing layer followed by removal of the solvent therefrom. Alternatively, the adhesive may be applied by first solution coating it onto a liner followed by removal of the solvent therefrom. The dried adhesive may then be nip laminated to the backing layer.

Alternatively, and presently preferably, the tape of the present invention may be prepared by coextruding an adhesive material and a separate polymeric backing material or blend of backing materials. For example, the multilayered, coextruded tape may be made using multi-layered coextrusion feedblocks such as those fabricated by The Cloeron Co., Orange, Tex. In one embodiment, a layer of backing material is coextruded with a layer of adhesive to form a two-layer tape. The backing material and adhesive are individually melted and fed using a screw extruder into a coextrusion feedblock where the melt streams were combined. In another embodiment, a core layer and a skin layer or skin layers are coextruded with an adhesive layer using a multilayered coextrusion feedblock.

The method in which the polymer blend is prepared is not particularly critical within the preferred range of proportions and with the inclusion of the preferred ingredients. Any conventional mixing device which provides substantial homogeneity can be employed. Another possible method is to prepare the blend in a twin-screw mixing extruder at the desired proportions. It is also possible to prepare a polymer "master-batch" concentrate and then add the appropriate quantity of either virgin resin to obtain the desired proportions. It is also appropriate to incorporate other polymer additives, e.g., plasticizers, colorants, fillers, processing aids, antiblocks, stabilizers, etc. in the concentrate to enhance their dispersibility in the final blend.

Films of the blends of this invention are readily prepared by intimately admixing the polymers; and extruding the resulting mixture in the form of a clear, flexible sheet or film which is subsequently cooled in a draw-down procedure to form a backing film having an average thickness in the range of about 0.01 mm to about 0.25 mm or more, more preferably in the range of about 0.03 mm to about 0.15 mm, and most preferably in the range of about 0.05 mm to about 0.10 mm. The thin sheet is extruded and drawn onto a chill roll.

Mixing of the required components is readily carried out in a conventional mixing apparatus such as a Banbury mixer or screw-type extruder. In one embodiment wherein the mixing device is a screw-type extruder, the materials are fed into the barrel of the extruder. The extruded mixture may be mixed with additional polymer(s) prior to final extrusion or may be fed directly into an extruder equipped with a sheet die, annular die, or coextrusion die and extruded in the form of a transparent sheet onto a chill roll and drawn down to form a film having the desired thickness. Suitable extrusion apparatus include a typical screw-type extruder, an extruder equipped with a ramming device and the like.

In a preferred embodiment the mixing and extruding steps are carried out in a single apparatus which is a typical screw-type extruder that is equipped with a sheet die or annular die and feed means placed along the extruder barrel which houses the screw or screws of the extruder. The blend materials are introduced as the polymer is being extruded at a rate such that a constant mixture is maintained. Similarly, concentrated master-batches can be added to virgin material in the screw-type extruder.

The tapes of the present invention are easily applied to ophthalmic lens blanks. Generally, the pressure-sensitive adhesive portion of the tapes of the present invention are applied to the front, or finished, surface of a lens blank. This may be done either by hand or, preferably, by means of a mechanical device. In either event, the tape of the present invention conforms readily to the configuration of the lens blank without wrinkles, folds, air bubbles, or other discontinuities between the adhesive and the front surface of the lens. Preferably, the tape of the invention is applied so that it covers the entire front surface or back surface of the lens. Normally it is applied to the front surface.

The tapes of the invention may be used on both plastic and glass lens blanks which may vary in curvature from plano to 10-base curve or higher. It is, of course, understood that the particular tape employed may be selected to suit the particular lens to be altered. Preferably, more conformable tapes are employed with lens blanks having a higher base curvature.

After application, excess tape is trimmed away from the periphery of the lens blank. The lens blank is then blocked. This may be accomplished by means of conventional blocking techniques using devices developed for this purpose. Representative examples of blocking devices are the Optek Blocker available from the Optek Division of Associated Development Corporation, and the Coburn Blocker available from the Coburn Company. In each of these devices, a molten fusible metal alloy is injected in a cavity provided between the taped lens and the block. Alternatively, a molten thermoplastic blocking composition (such as is described in co-pending provisional patent application Serial No. 60/003,918, filed on Sep. 18, 1995 and entitled: "Thermoplastic Lens Blocking Composition") is injected against the taped lens.

After the alloy or blocking composition has solidified and cooled, the blocked lens is removed from the blocking machine and is ready for mounting in the surfacing and/or edging machines. When these operations have been completed, the finished lens is deblocked, for example, by means of a sharp tap. This may be easily accomplished, for example, with the aid of a hollow cylinder that is adapted to support the finished lens on its wall while receiving the still attached lens blank within its hollow portion. By holding the lens and cylinder together and striking the bottom of the cylinder upon a hard surface, the bond between the alloy or blocking composition and the tape may be broken. The lenses may also be deblocked, for example, by melting the alloy or blocking composition in hot water. In either event, the tape is then removed from the lens and discarded. The lens and block may then, if necessary, be cleaned.

Reference is made to the figures wherein like parts have been given like index numbers. Throughout the drawings the various layers of backing, adhesive, or other layers have been exaggerated in thickness for purposes of illustration and clarity.

FIG. 1 is a schematic cross-sectional view of a tape of the present invention. The tape is shown having two layers, a backing layer 22, having first major surface 21, and an adhesive layer 20. In this embodiment, the backing layer 22 preferably comprises a blend of an olefin polymer or copolymer with a second polymer or copolymer that comprises an acid functionality, e.g., a copolymer of ethylene and acrylic acid. Alternatively, the backing layer may comprise a copolymer of an olefin monomer with a monomer that comprises acidic functionality.

Figure 2A:
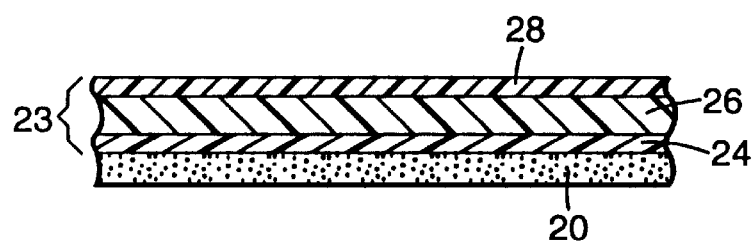
FIGS. 2a and 2b are schematic cross-sectional views of alternative tapes of the present invention.
Figure 2B:
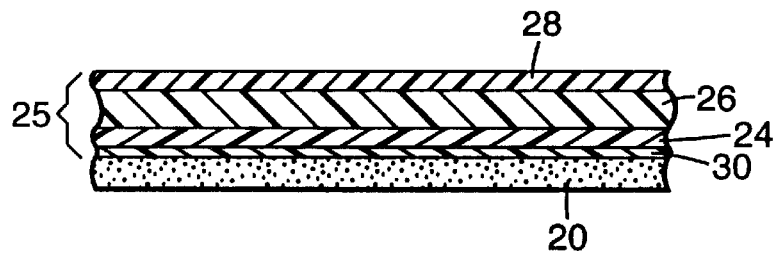

FIGS. 2a and 2b are schematic cross-sectional views of alternative tapes of the present invention. FIG. 2a illustrates a tape having a multilayered backing 23 comprising a core layer 26 and two skin layers (24 and 28). Preferably, the outer skin layer 28, having first major surface 21, comprises a blend of an olefin polymer or copolymer with a polymer comprising an acid functionality, e.g., a copolymer of ethylene and acrylic acid. The core layer 26 may comprise any suitable material as described in this specification and preferably comprises a copolymer of ethylene vinyl acetate or a nylon polymer. FIG. 2b illustrates a similar multilayered backing 25. However, in this embodiment the backing 25 is attached to the adhesive layer 20 by means of anchoring layer 30.

Figure 3:
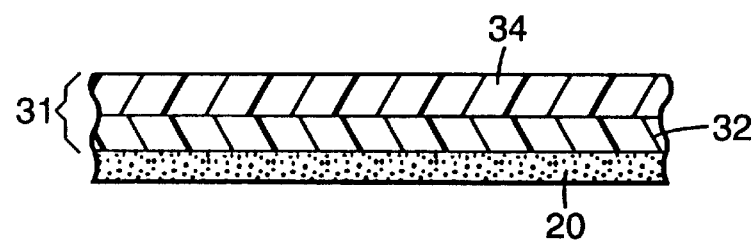
FIG. 3 is a schematic cross-sectional view of an alternative tape of the present invention.

FIG. 3 is a schematic cross-sectional view of an alternative tape of the present invention. In this embodiment, the tape comprises a multilayered backing 31 comprising two layers (32 and 34). An outer skin layer 34, having first major surface 21, preferably comprises a blend of an olefin polymer or copolymer with a polymer comprising an acid functionality, e.g., a copolymer of ethylene and acrylic acid. The core layer 32 may comprise any suitable material as described in this specification and preferably comprises a copolymer of ethylene vinyl acetate or a nylon polymer.

The following examples are offered to aid in the understanding of the present invention and are not to be construed as limiting the scope thereof. Unless otherwise indicated, all parts and percentages are by weight.

EXAMPLES

Example 1

Single layer films were extruded from blends of the compositions given in Table 1a. The ingredients were blended using a 3.175 cm diameter single screw extruder with a length to diameter (L:D) ratio of 30:1 (available from C. W. Brabender Instruments Inc., South Hackensack, N.J.). The temperature of the extruder inlet was maintained at 204° C. and the die was maintained at 249° C. The blended melt was extruded into a film using a 25.4 cm wide die with a 0.49 mm gap fabricated by Extrusion Dies Incorporated (EDI), Chippewa Falls, Wis. The film caliper was approximately 0.10 mm. A transfer adhesive (commercially available as "3M™ Transfer Adhesive No. 1524" from 3M Company, St. Paul, Minn.) was applied to one side of the film to form a lens surface protection tape.

Deblock Test

A deblock test was used to measure the deblocking force required to separate a blocked lens from the block. For this test, a 70 mm plastic lens (a 2.0–2.4 mm center thickness, plano, finished uncut, "RLX Plus™ Scratch Resistant, Finished Lens in Hard Resin" from Signet Armorlite, Inc., San Marcos, Calif.) is covered with a surface protective tape using the 3M™ SURFACE SAVER Applicator (available from 3M) with an air pressure setting of 0.28 MPa. Air pressure was set at 0.02–0.03 MPa for the blocker (commercially available as OPTEK™ Model 200 Blocker from Associated Development Corporation, Optex Division, Pinellas Park, Fla.). A brass blocking ring is placed on a blocker (e.g., OPTEK™ Model 200 Blocker) and a 56 mm diameter Coburn Block from Coburn Company is placed into the ring such that the inlet in the block fits snugly over the rubber nozzle. The block was allowed to equilibrate for 10 to 15 seconds at approximately 50 to 52° C. The block is then centered on the taped side of the lens and slowly filled with molten blocking composition. The blocked lens assembly is allowed to set for 10 to 15 seconds after filling, in order for the resin to harden and form a good bond to the taped lens. The blocking ring and blocked lens are removed from the blocker and the blocked lens is removed from the blocking ring. The blocked lens is then allowed to set for 1 hour before deblocking. The blocked lens is placed into the deblocking ring and the lens is taped to the deblocking ring using 1.27 cm wide filament tape. With the blocking tool facing downward, the blocked lens is placed in a hollow tube. The diameter of the tube is much greater than the blocking tool and the tube is sufficiently thick to abruptly stop the lens by its perimeter. The blocked lens assembly is dropped starting at 2.54 cm height and raised in 2.54 cm increments until the block separated from the tape or until 15.24 cm in height, then, raised and dropped in 5.08 cm increments up to 91.44 cm. The height in centimeters at which the block released from the tape is recorded as the deblock value in Table 1a.

TABLE 1a

| Run Number | Resin 1 Name | Resin 1 (wt. %) | Resin 2 Name | Resin 2 (wt. %) | Deblock Values after 1 hour (cm) |
|---|---|---|---|---|---|
| 1 | ethylene/acrylic acid copolymer (E/AA)[1] | 100 | | 0 | 48 |
| 2 | E/AA | 50 | ethylene/methacrylic acid copolymer zinc doped ionomer resin[2] | 50 | 30 |
| 3 | E/AA | 75 | very low density polyethylene[3] (VLDPE) | 25 | 51 |
| 4 | E/AA | 35 | VLDPE | 65 | 65 |
| 5 | E/AA | 75 | 80% VLDPE/ 20% linear low density polyethylene[4] (LLDPE) | 25 | 52 |
| 6 | E/AA | 20 | VLDPE | 80 | 9 |
| 7 | E/AA | 25 | 80% VLDPE/ 20% LLDPE | 75 | 13 |
| 8 | E/AA | 75 | 88/12 ethylene/vinyl acetate copolymer[5] (EVA) | 25 | 36 |
| 9 | E/AA[6] | 99 | UNI-REZ 2636[7] | 1 | 38.1 (28.7 |

TABLE 1a-continued

| Run Number | Resin 1 Name | Resin 1 (wt. %) | Resin 2 Name | Resin 2 (wt. %) | Deblock Values after 1 hour (cm) |
|---|---|---|---|---|---|
| 10 | E/AA[6] | 97 | UNI-REZ X35-643-40 | 3 | 37.3 (25.4 after 24 hours) |

[1]"PRIMACOR ™ 3440 Ethylene/Acrylic Acid Copolymer" from Dow Chemical Company, Midland, MI.
[2]"SURLYN ™ 1702 Ethylene/Methacrylic Acid Copolymer Zinc Doped Ionomer Resin from E. I. Du Pont de Nemours and Company, Wilmington, DE.
[3]"FLEXOMER ™ DFDA 1137 Very Low Density Polyethylene" from Union Carbide Chemicals and Plastics, Polyolefins Division, Danbury, CT.
[4]"DOWLEX ™ 2035 Linear Low Density Polyethylene" from Dow Chemical Company.
[5]"ELVAX ™ 660 Ethylene/Vinyl Acetate Copolymer" from E. I. Du Pont de Nemours and Company.
[6]"PRIMACOR ™ 3340 Ethylene/Acrylic Acid Copolymer" from Dow Chemical Company, Midland, MI.
[7]An adhesive grade thermoplastic polyamide resin based on dimerized fatty acids commercially available as "UNI-REZ ™ 2636" from Union Camp Corporation, Chemical Products Division, Jacksonville, FL.

Deblocking values preferably are between 5 cm to 56 cm for use in the lens grinding operation, however higher deblock values are functional as long as the film remains intact on the lens.

Example 2

Three layer films were coextruded from the compositions given in Table 2a producing two skin layers and a core layer. In Runs 32–34, 0.22 wt. percent of a blue dye (commercially available as "REMAFIN™ Blue E-500" from Hoechst-Celanese Corporation, Specialty Chemical Group, Coventry, R.I.) was added to the core layer composition given in Table 2a. The skin layers for Runs 1–24 were blended using a 3.175 cm diameter single screw extruder with a L:D ratio of 42:1 (available from Killion Extruders, Cedar Grove, N.J.). The extruder zone temperatures were increased from 68° C. at the extruder inlet to 221° C. at the die. The skin layers for Runs 25–34 were blended using a 34 mm diameter twin screw extruder with a L:D ratio of 42:1 (available from American Leistritz Extruder Corporation, Somerville, N.J.). The twin screw extruder zone temperatures were increased from 66° C. at the inlet to 221° C. at the die. The core layer for Runs 1–24 was blended using a 3.175 cm diameter screw extruder with a L:D ratio of 24:1 available from Killion Extruders. The core layer for Runs 25–34 was blended using a 5.08 cm diameter single screw extruder with a L:D ratio of 30:1 (available from Beryln Clay Group, Worcester, Mass.). Both extruder zone temperatures were increased from 127° C. at the extruder inlet to 221° C. at the die. The melt flow for the skin layer was split and combined with the melt flow for the core layer using a three layer coextrusion feedblock fabricated by Cloeren Company, Orange, Tex. The melt stream from the feedblock was formed into a film using a 25.4 cm wide "ULTRAFLEX™ 40 Die" fabricated by Extrusion Dies Incorporated. Runs 1–24 were made using the 25.4 cm wide die and Runs 25–34 were made using the 45.7 cm wide die. For Runs 1–31 a transfer adhesive (commercially available as "3M™ Transfer Adhesive No. 1524") was applied to one side of the film to form a lens surface protection tape. Films from Runs 32–34 were corona treated with a normalized energy of approximately 1.8 joules/square cm. An anchoring layer was applied to one side of the film layer from a 0.1% by weight solution of a water-soluble polymer in methanol and dried at 65° C. The water-soluble polymer was an epoxidized aminated polybutadiene prepared as described in Example 1 of U.S. Pat. No. 4,287,013. The films were then coated with a crosslinked 90/10 isooctylacrylate/acrylic acid (IOA/AA) adhesive made by the procedure described in Example 1 of U.S. Pat. No. 4,287,013 which is incorporated herein by reference, at a coating weight of approximately 25.2 g/square meter. The resulting tapes were slit into 10.2 cm rolls.

The conformability of the tape to an opthalmic lens was evaluated by blocking an opthalmic lens with the tape and qualitatively estimating the amount of edge lift. "Very conformable" (VC) means there was very little edge lift of the tape from the edge of the lens. "Conformable" (C) means the new tapes performed as well as the commercially available lens surface protection tapes. The results are recorded in Table 2b.

The clarity of the film was evaluated qualitatively by holding the film sample up to the fluorescent lights in the laboratory and giving ratings of "1" for the clearest film to "5" for the least clear. The results are recorded in Table 2b.

Deblock values for the adhesive force between the film and the alloy block were determined as described in Example 1 and recorded in Table 2b.

TABLE 2a

| | | Composition | | | | | | |
|---|---|---|---|---|---|---|---|---|
| | Ratio of Skin | Skin Layers | | | | Core Layer | | |
| Run No. | Core Skin | Resin 1 Name | Resin 1 (wt. %) | Resin 2 Name | Resin 2 (wt. %) | Resin 1 Name | Resin 1 (wt. %) | Resin 2 Name | Resin 2 (wt. %) |
| 1 | 1:3:1 | 90.5/9.5 ethylene/ acrylic acid copolymer (E/AA)[1] | 100 | — | 0 | 88/12 ethylene/ vinyl acetate copolymer (E/VA)[2] | 100 | — | 0 |
| 2 | 1:8:1 | 90.5/9.5 E/AA[1] | 100 | — | 0 | 88/12 E/VA[2] | 100 | — | 0 |
| 3 | 1:3:1 | 93.5/6.5 E/AA[3] | 100 | — | 0 | 88/12 E/VA[2] | 100 | — | 0 |

TABLE 2a-continued

| Run No. | Ratio of Skin Core Skin | Skin Layers Resin 1 Name | Resin 1 (wt. %) | Resin 2 Name | Resin 2 (wt. %) | Core Layer Resin 1 Name | Resin 1 (wt. %) | Resin 2 Name | Resin 2 (wt. %) |
|---|---|---|---|---|---|---|---|---|---|
| 4 | 1:8:1 | 93.5/6.5 E/AA[3] | 100 | — | 0 | 88/12 E/VA[2] | 100 | — | 0 |
| 5 | 1:3:1 | 93.5/6.5 E/AA[3] | 100 | — | 0 | very low density polyethylene (VLDPE)[4] | 65 | linear low density polyethylene (LLDPE)[5] | 35 |
| 6 | 1:8:1 | 93.5/6.5 E/AA[3] | 100 | — | 0 | VLDPE[4] | 65 | LLDPE[5] | 35 |
| 7 | | 90.5/9.5 E/AA[1] | 100 | — | 0 | VLDPE[4] | 65 | LLDPE[5] | 35 |
| 8 | | 90.5/9.5 E/AA[1] | 100 | — | 0 | VLDPE[4] | 65 | LLDPE[5] | 35 |
| 9 | | 90.5/9.5 E/AA[1] | 100 | — | 0 | ethylene/octene copolymer (E/O)[6] | 65 | LLDPE[5] | 35 |
| 10 | | 90.5/9.5 E/AA[1] | 100 | — | 0 | E/O[6] | 65 | LLDPE[5] | 35 |
| 11 | | 93.5/6.5 E/AA[3] | 100 | — | 0 | E/O[6] | 65 | LLDPE[5] | 35 |
| 12 | | 93.5/6.5 E/AA[3] | 100 | — | 0 | E/O[6] | 65 | LLDPE[5] | 35 |
| 13 | | 93.5/6.5 E/AA[3] | 75 | E/O[6] | 25 | E/O[6] | 65 | LLDPE[5] | 35 |
| 14 | | 93.5/6.5 E/AA[3] | 75 | E/O[6] | 25 | E/O[6] | 65 | LLDPE[5] | 35 |
| 15 | | 90.5/9.5 E/AA[1] | 75 | E/O[6] | 25 | E/O[6] | 65 | LLDPE[5] | 35 |
| 16 | | 90.5/9.5 E/AA[1] | 75 | E/O[6] | 25 | E/O[6] | 65 | LLDPE[5] | 35 |
| 17 | | 93.5/6.5 E/AA[3] | 75 | VLDPE[4] | 25 | E/O[6] | 65 | LLDPE[5] | 35 |
| 18 | | 93.5/6.5 E/AA[3] | 75 | VLDPE[4] | 25 | E/O[6] | 65 | LLDPE[5] | 35 |
| 19 | | 90.5/9.5 E/AA[1] | 75 | VLDPE[4] | 25 | E/O[6] | 65 | LLDPE[5] | 35 |
| 20 | | 90.5/9.5 E/AA[1] | 75 | VLDPE[4] | 25 | E/O[6] | 65 | LLDPE[5] | 35 |
| 21 | | 90.5/9.5 E/AA[1] | 75 | 88/12 E/VA[2] | 25 | 88/12 E/VA[2] | 100 | — | 0 |
| 22 | | 90.5/9.5 E/AA[1] | 75 | 88/12 E/VA[2] | 25 | 88/12 E/VA[2] | 100 | — | 0 |
| 23 | | 93.5/6.5 E/AA[3] | 75 | 88/12 E/VA[2] | 25 | 88/12 E/VA[2] | 100 | — | 0 |
| 24 | | 93.5/6.5 E/AA[3] | 75 | 88/12 E/VA[2] | 25 | 88/12 E/VA[2] | 100 | — | 0 |
| 25 | 1:8:1 | 90.5/9.5 E/AA[1] | 80 | E/O[6] | 20 | 88/12 E/VA[2] | 100 | — | 0 |
| 26 | 1:8:1 | 90.5/9.5 E/AA[1] | 100 | — | 0 | 88/12 E/VA[2] | 100 | — | 0 |
| 27 | 1:8:1 | 90.5/9.5 E/AA[1] | 100 | — | 0 | 88/12 E/VA[2] | 50 | 82/18 E/VA[7] | 50 |
| 28 | 1:10:1 | 93.5/6.5 E/AA[3] | 100 | — | 0 | E/O[6] | 100 | — | 0 |
| 29 | 1:8:1 | 93.5/6.5 E/AA[3] | 100 | — | 0 | E/O[6] | 65 | LLDPE[5] | 35 |
| 30 | 1:8:1 | 93.5/6.5 E/AA[3] | 70 | E/O[6] | 30 | E/O[6] | 65 | LLDPE[5] | 35 |
| 31 | 1:8:1 | 93.5/6.5 E/AA[3] | 80 | E/O[6] | 20 | 88/12 E/VA[2] | 80 | E/O[6] | 20 |
| 32 | 1:8:1 | 90.5/9.5 E/AA[1] | 80 | E/O[6] | 20 | 88/12 E/VA[2] | 100 | — | 0 |
| 33 | 1:8:1 | 93.5/6.5 E/AA[3] | 70 | E/O[6] | 30 | E/O[6] | 65 | LLDPE[5] | 35 |
| 34 | 1:8:1 | 93.5/6.5 E/AA[3] | 70 | E/O[6] | 30 | 88/12 E/VA[2] | 50 | LLDPE[5] | 50 |

[1]"PRIMACOR ™ 3460 Ethylene/Acrylic Acid Copolymer" from Dow Chemical Company.
[2]"ELVAX ™ 660 Ethylene/Vinyl Acetate Copolymer" from E. I. Du Pont de Nemours and Company.
[3]"PRIMACOR ™ 3340 Ethylene/Acrylic Acid Copolymer" from Dow Chemical Company.
[4]"FLEXOMER ™ DFDA 1137 Very Low Density Polyethylene" from Union Carbide Chemicals and Plastics, Polyolefins Division, Danbury, CT.
[5]"ASPUN ™ 6806 Linear Low Density Polyethylene" from Dow Chemical Company, Midland, MI.
[6]"ATTANE ™ 4602 Ethylene/Octene Copolymer" from Dow Chemical Company, Midland, MI.
[7]"ELVAX ™ 420 Ethylene/Vinyl Acetate Copolymer" from E. I. Du Pont de Nemours and Company.

TABLE 2b

| Run Number | Lens Conformability | Film Clarity | Deblock Values after 1 hour (cm) |
|---|---|---|---|
| 1 | VC | 1 | 38.1 |
| 2 | VC | 1 | 35.6 |
| 3 | VC | 2 | 5.1 |
| 4 | C | 2 | 5.1 |
| 5 | C | 2 | 12.7 |
| 6 | C | 2 | 17.8 |
| 7 | VC | 2 | 5.1 |
| 8 | C | 1.5 | 6.4 |
| 9 | C | 2 | 22.9 |
| 10 | VC | 2 | 35.6 |
| 11 | C | 2 | 22.9 |
| 12 | C | 2 | 40.6 |
| 13 | VC | 3 | 30.5 |
| 14 | C | 3 | 25.4 |
| 15 | VC | 3 | 7.6 |
| 16 | C | 3 | 6.4 |
| 17 | C | 5 | 5.1 |
| 18 | C | 5 | 5.1 |

TABLE 2b-continued

| Run Number | Lens Conformability | Film Clarity | Deblock Values after 1 hour (cm) |
|---|---|---|---|
| 19 | C | 5 | 8.9 |
| 20 | VC | 5 | 22.9 |
| 21 | VC | 5 | 53.3 |
| 22 | C | 5 | 50.8 |
| 23 | VC | 5 | 99.1 |
| 24 | VC | 5 | 43.2 |
| 25 | — | — | 21.0 |
| 26 | — | — | 39.4 |
| 27 | — | — | 39.8 |
| 28 | — | — | 57.2 |
| 29 | — | — | 9.3 |
| 30 | — | — | 17.8 |
| 31 | — | — | 27.9 |
| 32 | — | — | 19.0 |
| 33 | — | — | 19.0 |
| 34 | — | — | 20.3 |

Example 3

A two-layer lens surface protection tape was coextruded in a one step process. The film layer or "backing" was made from 80 wt % of a 90.5 parts E/9.5 parts AA copolymer (available as "PRIMACOR™ 3460 Ethylene/Acrylic copolymer" from Dow Chemical Company) and 20 wt % of an E/O copolymer (available as "ATTANE™ 4602 Ethylene/Octene Copolymer" from Dow Chemical Company). The copolymers were blended using a 3.175 cm diameter single screw extruder with a L:D ratio of 24: (available from Killion Extruders). The extruder zone temperatures were increased from 116° C. at the extruder inlet to 199° C. at the die. The adhesive layer was made from 75 wt. % of a styrene-isoprene-styrene (SIS) linear block copolymer (available as "KRATON™ D1107" from Shell Chemical Company, Houston, Tex.) and 25 wt % of a 96 parts IOA/4 parts methacrylic acid (MAA) copolymer with 0.1% p-acryloxybenzophenone (ABP) crosslinker made by the process described in Example V of U.S. Pat. Nos. 4,952,650 and 4,833,179 which are incorporated herein by reference. The adhesive layer was preblended using a 34 mm diameter twin screw extruder with a L:D ratio of 42:1 (available from American Leistritz Extruder Corporation). The twin screw extruder zone temperatures were increased from 116° C. at the inlet to 199° C. at the die. The preblending produced strands of adhesive which were further processed using a 3.175 cm diameter single screw extruder with a L:D ratio of 42:1(available from Killion Extruders). The extruder zone temperatures were increased from 121° C. at the extruder inlet to 199° C. at the die. The melt flows of the film layer and the adhesive layer were combined in a "Cloeren™ Model 92-1033 feedblock" and formed into a tape using a 25.4 cm wide "ULTRAFLEX™ 40 Die" fabricated by Extrusion Dies Incorporated. The feedblock and die temperatures were maintained at 199° C. The tape was wound up without a liner. Deblock values were determined using the Deblock Test described in Example 1. The average deblock value for this lens surface protection tape was 64.8 cm. The tape exhibited good conformability and adequate clarity.

Example 4

Two layer lens surface protection tapes were coextruded in a one step process. For the film layer or "backing," resins were blended using a 6.35 cm diameter single screw extruder with a L:D ratio of 30:1 (available from Crompton & Knowles Corp., Davis Standard Division, Pawiatuck, Conn.). The amounts and types of resins are listed in Table 4a. "REMAFIN™ Blue E-500 Pigment" (available from Hoechst-Celanese Corporation, Specialty Chemical Group) was preblended with a linear low density polyethylene (LLDPE) in a ratio of 8.33 pigment/91.67 LLDPE and supplied by Hoechst-Celanese Corporation as "AEWU-18". Six percent of the preblended pigment concentrate was then blended with the resins in the film layer. The temperature of the extruder inlet was maintained at 93° C. The extruder outlet and neck tube temperatures were kept at the same temperatures and are reported in Table 4a.

The composition of the adhesives is shown in Table 4a. The adhesive layer was blended using a 58 mm diameter twin screw extruder with a L:D ratio of 44:1 (available from Crompton & Knowles Corp. The temperature of the extruder inlet was maintained at 38° C. and the extruder outlet and neck tube temperatures were maintained at 188° C.

The melt flows of the film layer and the adhesive layer were combined in a "Cloeren™ Model 93-1123 feedblock" and formed into a film using a "Cloeren EPOCH™ 3 Die". The feedblock temperature was maintained at 204° C. and the die temperature was maintained at 199° C. The film layer was approximately 0.05 mm thick and the adhesive layer was approximately 0.076 mm thick.

TABLE 4a

| Run Number | Extruder Outlet and Neck Tube Temperature (° C.) | Composition | | | | | | |
|---|---|---|---|---|---|---|---|---|
| | | Film Layer | | | | | Adhesive Layer | |
| | | Resin 1[1] (wt. %) | Resin 2[2] (wt. %) | Resin 3[3] (wt. %) | Resin 4[4] (wt. %) | Pigment[5] (wt. %) | Adhesive 1[6] (wt. %) | Adhesive 2[7] (wt. %) |
| 1 | 232 | 94 | 0 | 0 | 0 | 6 | 75 | 25 |
| 2 | 238 | 0 | 75 | 0 | 19 | 6 | 75 | 25 |
| 3 | 227 | 86 | 0 | 0 | 8 | 6 | 93 | 7 |
| 4 | 227 | 86 | 0 | 0 | 8 | 6 | 57 | 43 |
| 5 | 232 | 0 | 75 | 0 | 19 | 6 | 75 | 25 |
| 6 | 232 | 0 | 75 | 0 | 19 | 6 | 50 | 50 |

TABLE 4a-continued

| | Extruder Outlet and Neck Tube | Composition | | | | | | |
|---|---|---|---|---|---|---|---|---|
| | | Film Layer | | | | | Adhesive Layer | |
| Run Number | Temperature (° C.) | Resin 1[1] (wt. %) | Resin 2[2] (wt. %) | Resin 3[3] (wt. %) | Resin 4[4] (wt. %) | Pigment[5] (wt. %) | Adhesive 1[6] (wt. %) | Adhesive 2[7] (wt. %) |
| 7 | 238 | 0 | 75 | 0 | 19 | 6 | 100 | 0 |
| 8 | 249 | 20 | 0 | 0 | 74 | 6 | 57 | 43 |
| 9 | 249 | 0 | 0 | 20 | 74 | 6 | 75 | 25 |
| 10 | 227 | 30 | 0 | 70 | 0 | 0 | 100 | 0 |
| 11 | 254 | 20 | 0 | 0 | 74 | 6 | 93 | 7 |
| 12 | 238 | 0 | 0 | 94 | 0 | 6 | 100 | 0 |
| 13 | 238 | 30 | 0 | 64 | 0 | 6 | 100 | 0 |

[1]"PRIMACOR ™ 3460 Ethylene/Acrylic Acid Copolymer" from Dow Chemical Company.
[2]"PRIMACOR ™ 3340 Ethylene/Acrylic Acid Copolymer" from Dow Chemical Company.
[3]"PRIMACOR ™ 3150 Ethylene/Acrylic Acid Copolymer" from Dow Chemical Company.
[4]"ATTANE ™ 4602 Ethylene/Octene Copolymer" from Dow Chemical Company.
[5]"AEWU-18 Blue Pigment Preblended Concentrate" prepared by Hoechst-Celanese Corp., Specialty Chemical Group, Coventry, RI.
[6]94 parts IOA /6 parts AA with 0.4% ABP crosslinker made by the process described in U.S. Pat. Nos. 4,737,559 and 4,847,137, which are incorporated herein by reference.
[7]"KRATON ™ D1128" from Shell Chemical Company made by the process described in U.S. Pat. Nos. 5,183,705 and 5,194,500.

The tapes were evaluated using the Deblock Test described in Example 1 except that a second set of blocked lens were deblocked after being allowed to set for 24 hours. The results are reported in Table 4b.

The tapes were also evaluated for percent haze, light transmission, tensile strength and elongation using the procedures described below.

Haze Measurement

Percent Haze was determined using ASTM 1003-61. This procedure is use to determine the clarity of films by measuring the ratio of diffused light to transmitted light. The instrument used to measure haze was the Gardner XL-211 Series Hazegard System from Pacific Scientific Company. The samples were 5 cm by 5 cm and were measured from the non-adhesive side. Five to 12 readings were averaged for each run and reported in Table 4b.

Light Transmission

Light Transmission was measured using a spectrophotometer with a 2° observer, a D50 light source at 600 nanometers, and an ANSI "T" filter set available as "GRETAG™ SPM 100" from Gretag, Inc., Regensdorf, Switzerland. Color density was reported as $D_y$, $D_b$, $D_c$, and $D_m$. The larger the number, the more light is transmitted through the backing.

Tensile Strength and Elongation

Tensile Strength and Percent Elongation in the machine and cross machine directions were determined using ASTM Test Method D 882-91 "Standard Test Methods for Tensile Properties of Thin Plastic Sheeting" Test Method A: Static Weighing, Constant-Rate-of-Grip Separation Test on an "INSTRON™ Model No. 1122 Tensile Tester" from Instron Corporation, Canton, Mass. The films were tested in the machine direction and the results of 3 samples were averaged. The crosshead speed was 25.4 cm/min; the size of each sample was 10. 2 cm long, 2.54 cm wide, and 0.127 mm thick; and the distance between the grips was 5.08 cm.

TABLE 4b

| Run No. | Deblock Values 0after: | | Light Transmission | | | | Haze (%) | Tensile Strength (Pa) | Elongation (%) |
|---|---|---|---|---|---|---|---|---|---|
| | 1 hour (cm) | 24 hours (cm) | $D_y$ | $D_b$ | $D_c$ | $D_m$ | | | |
| 1 | 35.6 | 33.8 | 1.047 | 1.402 | 1.591 | 1.253 | 65.6 | 42.07 | 262 |
| 2 | 21.1 | 21.1 | 1.035 | 1.408 | 1.607 | 1.250 | 63.9 | 44.14 | 272 |
| 3 | 68.6 | 40.6 | 1.210 | 1.603 | 1.754 | 1.473 | 62.7 | 40.69 | 239 |
| 4 | >91.4 | >91.4 | 0.847 | 1.186 | 1.373 | 1.040 | 66.9 | 42.76 | 411 |
| 5 | 23.6 | 11.9 | 1.057 | 1.426 | 1.614 | 1.277 | 62.9 | 44.14 | 293 |
| 6 | 47.5 | 34.8 | 0.854 | 1.247 | 1.470 | 1.081 | 60.1 | 49.66 | 426 |
| 7 | 10.9 | 10.9 | 1.686 | 1.960 | 1.891 | 2.061 | 23.3 | 39.31 | 187 |
| 8 | 10.2 | 11.9 | 0.923 | 1.289 | 1.468 | 1.145 | 69.3 | 58.62 | 580 |

TABLE 4b-continued

| Run No. | Deblock Values 0after: 1 hour (cm) | 24 hours (cm) | Light Transmission $D_y$ | $D_b$ | $D_c$ | $D_m$ | Haze (%) | Tensile Strength (Pa) | Elongation (%) |
|---|---|---|---|---|---|---|---|---|---|
| 9  | 7.6   | 5.1   | 1.040 | 1.395 | 1.569 | 1.252 | 68.5 | 51.72 | 524 |
| 10 | 15.2  | 17.0  | 1.973 | 2.158 | 2.218 | 2.101 | 19.1 | 34.48 | 147 |
| 11 | >91.4 | >91.4 | 1.258 | 1.612 | 1.710 | 1.520 | 54.3 | 35.86 | 274 |
| 12 | 13.5  | 11.9  | 1.761 | 2.032 | 1.979 | 2.104 | 25.4 | 35.17 | 155 |
| 13 | 10.9  | 9.4   | 1.719 | 1.993 | 1.938 | 2.075 | 29.3 | 36.55 | 164 |

The tapes were further evaluated for adhesive transfer to glass, two-bond adhesion, adhesion to steel, adhesion to glass, liner release, and mechanical unwind using the procedures described below. The results are reported in Table 4c.

Adhesive Transfer

Adhesive transfer ratings were determined by using an accelerated adhesion to glass test. Glass plates (5 cm by 15 cm) were cleaned by washing once with diacetone alcohol and three times with n-heptane and drying with "KIMWIPES™" Kimberly-Clark, Roswell, Ga. The tapes were applied to the glass plates so that at least 2.5 cm extended beyond the plate. A 2 kg roller was rolled across the tape on the plate samples once in each direction at a rate of approximately 5 cm per second. The samples were placed in a 66° C. oven for 5 minutes and cooled for 20 hours. The tape was then peeled from the glass plate using a "Slip/Peel Tester SP 102B3M90" (available from Instrumentors, Inc., Strongsville, Ohio). The glass plate was examined for the amount of adhesive transfer from the tape backing to the plate. The amount was recorded as a percent of adhesive transfer and the percent was recorded as a rating from "0" for no adhesive transfer to "10" for complete adhesive transfer.

Two-Bond Adhesion

Two-bond adhesion was used to determine the force necessary to remove a pressure sensitive adhesive from its backing using MTA Test Tape No. 254 at a speed of 225 cm per minute. A 2.5 cm wide strip of double coated tape without a liner was centered lengthwise on a 10 cm by 30 cm glass plate. The tapes of the invention were superimposed on the double coated tape with the adhesive side facing up. A strip of cleaning tape was pressed firmly across the left hand end of the tape so that about 5 cm of the tape was covered. A 30 to 36 cm strip of MTA Test Tape No. 254 was placed with the adhesive against the tape so that it was centered lengthwise with the tape and so that about 2.5 cm extended beyond the left hand end of the plate. The sample assembly was rolled once mechanically with a 2 kg roller. At the left hand end of the assembly, the operator attempted to initiate 100% adhesive transfer of the tape adhesive to the Test Tape by hand manipulation. The end of the tape was attached to the "Slip/Peel Tester SP 102B3M90" and the adhesive peeled from the backing mechanically. The average force was recorded in ounces per inch and converted to grams per cm.

Adhesion to Steel

ASTM D1000 "Adhesion Test on Instron-Without Dwell" was used to determine adhesion to steel. A 51 cm by 127 cm by 1.6 mm number 302 AISI stainless steel, bright annealed finish panel was cleaned thoroughly using 50% n-heptane/50% isopropanol and dried by wiping with a KIMWIPES™. The tape was placed lengthwise, adhesive side down, and along the center line of the panel so that from 127 to 178 mm extended beyond the panel. The average peel value was recorded in grams per cm. The results are reported in Table 4c. A 2 kg roller was rolled across the tape on the panel samples once in each direction at a rate of approximately 5 cm per second. The free end of the tape was doubled back and peeled approximately 2.5 cm from panel. The end of the panel, from which the tape was removed was clamped into the lower jaw of an "INSTRON™ Model No. 1122" tensile tester. The free end of the tape was folded adhesive to adhesive to form a tab and the tab was clamped into the upper jaw. The gauge length was 13 cm. The tensile tester was activated at a crosshead speed of 30 cm per minute and the tape striped from the panel mechanically. The average peel value was recorded in grams per cm.

Adhesion to Glass

A 10 cm by 30 cm glass plate which was painted black on the bottom side was cleaned by washing once in diacetone alcohol and three time in n-heptane. The tape was lightly placed along the center of the plate lengthwise with the adhesive side down. A 2 kg roller was rolled across the tape on the plate samples once in each direction at a rate of approximately 5 cm per second. The end of the tape was attached to the "Slip/Peel Tester SP 102B3M90" and the adhesive peeled from the plate mechanically. The average force to remove a pressure sensitive adhesive from a standard glass surface was recorded in grams per cm.

Liner Release

The force needed to remove a tape from its liner when peeled at an angle of 180° at a speed of 225 cm per minute was measured using a "Slip/Peel Tester SP 102B3M90". A 2.5 cm wide strip of double coated tape without a liner was centered lengthwise on a 10 cm by 30 cm glass plate. The tapes of the invention were superimposed on the double coated tape with the liner side down over the double coated tape. A 2 kg roller was rolled across the tape on the plate samples once in each direction at a rate of approximately 5 cm per second. The end of the tape was attached to the "Slip/Peel Tester SP 102B3M90" and the adhesive peeled from the liner mechanically. The average force to remove a tape from its liner was recorded in grams per cm.

Mechanical Unwind

The force needed to unwind a roll of tape was determined by using a "Slip/Peel Tester SP 102B3M90" with an unwind subassembly. The speed of unwind was 225 cm/minute for an average time of test of 5 seconds. A finished roll of tape was attached to the subassembly and the end of the tape was attached to the slip/peel tester. The average unwind value was recorded in grams per cm.

TABLE 4c

| Run Number | Adhesive Transfer (0 to 10) | 2-Bond Adhesion (g/cm) | Adhesion to Steel (g/cm) | Adhesion to Glass (g/cm) | Liner Release (g/cm) | Mechanical Unwind (g/cm) |
|---|---|---|---|---|---|---|
| 1 | 9.0 | 718.7 | 160.70 | 185.26 | 1.9 | 167.40 |
| 2 | 6.0 | 611.57 | 143.96 | 242.17 | 2.1 | 117.18 |
| 3 | 2.0 | 670.72 | 158.47 | 293.51 | 2.2 | 161.82 |
| 4 | 5.0 | 649.51 | 177.44 | 293.51 | 0.9 | 89.28 |
| 5 | 6.5 | 681.88 | 152.89 | 268.96 | 2.1 | 133.92 |
| 6 | 3.0 | 765.58 | 197.53 | 267.84 | 1.1 | 61.38 |
| 7 | 0.0 | 561.35 | 109.37 | 238.82 | 3.1 | 156.24 |
| 8 | 5.0 | 592.60 | 176.33 | 268.96 | 1.9 | 61.38 |
| 9 | 8.5 | 697.50 | 151.78 | 264.49 | 1.8 | 83.70 |
| 10 | 1.0 | 525.64 | 82.58 | 193.07 | 3.1 | — |
| 11 | 0.0 | 576.97 | 145.08 | 249.98 | 3.4 | 111.60 |
| 12 | 0.0 | 493.27 | 110.48 | 244.40 | 2.5 | 111.60 |
| 13 | 0.0 | 473.18 | 124.99 | 253.33 | 3.2 | 89.28 |

An aging study was done to determine the mechanical unwind force for the above tapes when wound without liners and stored for up to 274 days at intervals of about 30 days. The tapes were stored at approximately 21° C. in the laboratory. The results are shown in Table 4d.

Example 5

Two layer lens surface protection tapes were coextruded in a one step process using various backing layers and various alternative new adhesive materials. The film layer resins and optionally the aforementioned preblended pigment ("AEWU-18" supplied by Hoechst-Celanese Corporation) were blended and extruded as described in Example 4. The amounts and types of resins and preblended pigment are listed in Table 5a. The temperature of the extruder inlet was maintained at 82° C. The extruder outlet and neck tube were kept at the same temperatures and are reported in Table 5a. Runs 12–14 illustrate suitable tie layer materials which were coextruded with adhesive. The amounts and types of resins are listed in Table 5b.

The composition of the adhesives is reported in Table 5a and 5b. The adhesive layer was blended and extruded as described in Example 4. The temperature of the extruder inlet was maintained at 16° C. and the extruder outlet and neck tube temperatures were maintained at 177° C.

The melt streams of the film and adhesive layers were combined in a "Cloeren™ Model 93-1123 feedblock" and formed into a film using a "Cloeren EPOCH™ 3 Die". The feedblock temperature was maintained at 204° C. and the die temperature was maintained at 177° C. for Runs 1–13 and at 254° C. for Run 14. The film layer was approximately 0.05 mm thick and the adhesive layer was approximately 0.076 mm thick.

TABLE 4d

| | Unwind Test After: | | | | | | | | | |
|---|---|---|---|---|---|---|---|---|---|---|
| Run Number | Initial (g/cm) | 31 days (g/cm) | 64 days (g/cm) | 99 days (g/cm) | 127 days (g/cm) | 155 days (g/cm) | 176 days (g/cm) | 217 days (g/cm) | 252 days (g/cm) | 274 days (g/cm) |
| 1 | 167.40 | 181.35 | 184.14 | 184.14 | 186.93 | 186.93 | 184.14 | 186.93 | 186.93 | 189.72 |
| 2 | 117.18 | 147.87 | 145.08 | 150.66 | 150.66 | 156.24 | 147.87 | 161.82 | 153.45 | 159.03 |
| 3 | 161.82 | 181.35 | 181.35 | 181.35 | 186.93 | 184.14 | 186.93 | 184.14 | 195.30 | 189.72 |
| 4 | 89.28 | 136.71 | 139.50 | 139.50 | 150.66 | 150.66 | 150.66 | 150.66 | 153.45 | 150.66 |
| 5 | 133.92 | 170.19 | 167.40 | 167.40 | 170.19 | 170.19 | 167.40 | 170.19 | 172.98 | 181.35 |
| 6 | 61.38 | 78.12 | 89.28 | 97.65 | 100.44 | 106.02 | 106.02 | 108.81 | 119.97 | 119.97 |
| 7 | 156.24 | 184.14 | 184.14 | 189.72 | 192.51 | 186.93 | 186.93 | 195.30 | 195.30 | 198.09 |
| 8 | 61.38 | 80.91 | 83.70 | 92.07 | 83.70 | 94.86 | 89.28 | 83.70 | 111.60 | 117.18 |
| 9 | 83.70 | 117.18 | 117.18 | 106.02 | 106.02 | 106.02 | 111.60 | 108.81 | 111.60 | 117.18 |
| 11 | 111.60 | 139.50 | 139.50 | 136.71 | 139.50 | 142.29 | 142.29 | 147.87 | 150.66 | 150.66 |
| 12 | 111.60 | 139.50 | 142.29 | 147.87 | 136.71 | 147.87 | 145.08 | 142.29 | 142.29 | 150.66 |
| 13 | 89.28 | 119.97 | 122.76 | 125.55 | 122.76 | 122.76 | 125.55 | 128.34 | 131.13 | 131.13 |

TABLE 5a

| Run Number | Extruder Outlet and Neck Tube Temperatures (° C.) | Composition | | | | | | | |
|---|---|---|---|---|---|---|---|---|---|
| | | Film Layer | | | | | Adhesive Layer | | |
| | | Resin 1[1] (%) | Resin 2[2] (%) | Resin 3[3] (%) | Resin 4[4] (%) | Pigment[5] (%) | Adhesive 1[6] (wt. %) | Adhesive 2 (wt. %) | Adhesive 3[9] (wt. %) |
| 1 | 204 | 80.00 | 0 | 19.75 | 0 | 0.25 | 25 | 74[7] | 1 |
| 2 | 204 | 80.00 | 0 | 19.50 | 0 | 0.50 | 75 | 25[7] | 0 |
| 3 | 216 | 80.00 | 0 | 19.00 | 0 | 1.00 | 100 | 0 | 0 |
| 4 | 204 | 80.00 | 0 | 19.75 | 0 | 0.25 | 44 | 56[7] | 0 |
| 5 | 204 | 80.00 | 0 | 19.75 | 0 | 0.25 | 63 | 38[7] | 0 |
| 6 | 204 | 80.00 | 0 | 19.66 | 0 | 0.33 | 44 | 55[7] | 1 |
| 7 | 204 | 80.00 | 0 | 19.75 | 0 | 0.25 | 81 | 15[7] | 4 |
| 8 | 188 | 0 | 70.00 | 0 | 29.90 | 0.10 | 75 | 25[8] | 0 |
| 9 | 204 | 0 | 70.00 | 0 | 29.67 | 0.33 | 100 | 0 | 0 |
| 10 | 188 | 0 | 50.00 | 0 | 49.67 | 0.33 | 25 | 75[8] | 0 |
| 11 | 188 | 0 | 30.00 | 0 | 69.75 | 0.25 | 44 | 56[8] | 0 |

[1]"PRIMACOR ™ 3340 Ethylene/Acrylic Acid Copolymer" from Dow Chemical Company.
[2]"PRIMACOR ™ 3460 Ethylene/Acrylic Acid Copolymer" from Dow Chemical Company.
[3]"ATTANE ™ 4602 Ethylene/Octene Copolymer" from Dow Chemical Company.
[4]"SURLYN ™ 1702-1 Ethylene/Methacrylic Acid Copolymer, Zinc doped Ionomer Resin" from E. I. Du Pont de Nemours and Company.
[5]"AEWU-18 Blue Pigment Preblended Concentrate" prepared by Hoechst-Celanese Corp.
[6]94 parts IOA /6 parts AA with 0.4% ABP crosslinker made by the process described in U.S. Pat. Nos. 4,737,559 and 4,847,137.
[7]"ENGAGE ™ 8200 Polyolefin Elastomer" from Dow Chemical Company.
[8]"KRATON ™TM G-1657 Styrene-ethylene-butylene-styrene (SEBS) Linear Block Copolymer from Shell Chemical Company.
[9]"BYNEL ™ E369 Anhydride Modified Ethylene Acrylate" from E. I. Du Pont de Nemours and Company.

TABLE 5b

| Run Number | Extruder Outlet and Neck Tube Temperature (° C.) | Resin (wt. %) | Adhesive[4] (wt. %) |
|---|---|---|---|
| 12 | 249 | 100[1] | 100 |
| 13 | 204 | 100[2] | 100 |
| 14 | 266 | 100[3] | 100 |

[1]"BYNEL ™ E369 Anhydride Modified Ethylene Acrylate" from E. I. Du Pont de Nemours and Company.
[2]"ELVAX ™ 260 Ethylene/Vinyl Acetate Copolymer" from E. I. Du Pont de Nemours and Company.
[3]"CAPRON ™ XTRAFORM ™ 3839FN Nylon 6/6,6 Nucleated Copolymer" from AlliedSignal Inc., Morristown, NJ.
[4]94 parts IOA/6 parts AA with 0.4% ABP crosslinker made by the process described in U.S. Pat. Nos. 4,737,559 and 4,847,137.

The lens surface protection tapes were evaluated using the Deblock Test described in Example 1 except that a second set of blocked lens were deblocked after being allowed to set for 24 hours. The tapes were also evaluated for percent haze using the procedures described in Example 4. The results are reported in Table 5c.

TABLE 5c

| Run Number | Deblock Values after: | | Haze (%) |
|---|---|---|---|
| | 1 hour (cm) | 24 hours (cm) | |
| 1 | 15.24 | 8.47 | 15.0 |
| 2 | 11.85 | 10.16 | 8.8 |
| 3 | 13.55 | 11.01 | 4.9 |
| 4 | 15.24 | 9.31 | 12.6 |
| 5 | 10.16 | 8.47 | 9.5 |

TABLE 5c-continued

| Run Number | Deblock Values after: | | Haze (%) |
|---|---|---|---|
| | 1 hour (cm) | 24 hours (cm) | |
| 6 | 13.55 | 10.16 | 14.6 |
| 7 | 12.70 | 14.39 | 13.9 |
| 8 | >91.44 | 44.03 | 19.2 |
| 9 | 37.25 | 20.32 | 6.9 |
| 10 | 50.80 | 28.79 | 18.3 |
| 11 | 64.35 | 50.80 | 19.9 |
| 12 | — | — | 19.1 |
| 13 | — | — | 8.0 |
| 14 | — | — | 9.7 |

The tapes were further evaluated for adhesive transfer to glass, two-bond adhesion, adhesion to steel, adhesion to glass, and liner release using the procedures described in Example 4. In addition these tapes were evaluated for holding power as described below. The results are reported in Table 5d.

Holding Power

Holding power or shear adhesion of the tapes was determined by using a modification of ASTM D3654-88 "Standard Test Method for Holding Power of Pressure-Sensitive Tapes" Procedure A. A 7.6 cm by 7.6 cm by 12.7 mm, Type 304, 2B bright annealed stainless steel panel was washed once with diacetone alcohol and three time with n-heptane. An auxiliary 5 cm by 65 cm by 13 cm plate for rolling was place flush with the edge of the stainless steel panel. A 2.54 cm wide strip of tape was laid adhesive side down on the steel panel and adhered 2.54 cm from the edge using a 2.54 cm razor cut-off block. The end of the strip of tape extended onto the auxiliary plate by 5 cm. A 2 kg roller was rolled twice across the tape on the panel and plate sample once in each direction at a rate of approximately 30 cm per minute. The auxiliary plate was removed from the tape end by drawing the assembly to the edge of the table and pressing downward between the samples, at the steel panel edge of the auxiliary plate. The tape end was folded back squarely over the center of an adapter hook so that the doubled portion of the tape was at least 2.5 cm long. The steel panel was transferred to a shear stand to hold the panel in a vertical position. Two 500 g weights were hung on the adapter hook. The amount of time was recorded in hours for the weight and sample to fall or the test was terminated after 166 hours.

TABLE 5d

| Run Number | Adhesive Transfer (0 to 10) | 2-Bond Adhesion (g/cm) | Adhesion to Steel (g/cm) | Adhesion to Glass (g/cm) | Liner Release (g/cm) | Holding Power (hours) |
|---|---|---|---|---|---|---|
| 1  | 0.0  | 460.78 | 8.00   | 15.21  | 0.6 | >233 |
| 2  | 10.0 | 822.24 | 372.26 | 648.02 | 2.0 | >233 |
| 3  | 0.8  | 532.08 | 148.13 | 373.12 | 5.5 | >233 |
| 4  | 7.1  | 717.09 | 20.87  | 46.87  | 0.5 | >233 |
| 5  | 10.0 | 734.70 | 322.41 | 112.34 | 2.2 | >214 |
| 6  | 0.2  | 703.58 | 14.17  | 24.44  | 0.4 | >171 |
| 7  | 10.0 | 715.60 | 31.06  | 119.37 | 2.1 | >171 |
| 8  | 7.4  | 524.40 | 34.63  | 56.02  | 2.1 | >214 |
| 9  | 0.1  | 733.09 | 153.34 | 343.73 | 4.3 | >171 |
| 10 | 0.1  | 454.71 | 13.47  | 16.96  | 1.6 | >214 |
| 11 | 0.1  | 534.81 | 15.21  | 19.31  | 1.7 | >214 |
| 12 | 0.0  | 612.06 | 54.80  | 207.95 | 1.0 | >171 |
| 13 | 0.1  | 606.98 | 150.77 | 249.98 | 0.9 | >171 |
| 14 | 0.0  | 700.10 | 222.68 | 447.89 | 5.2 | >171 |

EXAMPLE 6

Three layer lens surface protection tapes were coextruded in a one step process. The three layers were an outer film layer (skin), a tie layer (core) and an adhesive layer. The compositions of the various layers used to make the tapes are given in Table 6a. The target thickness for the outer film layer, tie layer, and adhesive layer are reported in Table 6b.

The outer film layer was a blend of an E/AA copolymer and an E/O copolymer. Six percent of a pigment was added to this blend. The resins and pigments as described in Table 6a were blended using a 58 mm diameter twin screw extruder with a L:D ratio of 44:1 (available from Crompton & Knowles Corp.) The temperature of the extruder inlet was maintained at 21° C. and the extruder outlet and neck tube temperatures were maintained at 166° C.

The tie layer was made from a nylon 6/nylon 6,6 copolymer (available as "CAPRON™ XTRAFORM™ 3839FN Nylon 6/6,6 Nucleated Copolymer" from AlliedSignal Inc.). The tie layer (core) was processed using a 6.35 cm diameter single screw extruder with a L:D ratio of 30:1 (available from Crompton & Knowles Corp.). The temperature of the extruder inlet was maintained at 93° C. and the extruder outlet and neck tube temperatures were maintained at 293° C.

The adhesive layer for Runs 1, 4, and 9 was a 94 parts IOA/6 parts AA acrylic adhesive with 0.4% ABP crosslinker made by the process described in U.S. Pat. Nos. 4,737,559 and 4,847,137. For Runs 2, 3, 5, 6, 8, 15, and 16, the 94 parts IOA/6 parts AA acrylic adhesive was blended with a rubber adhesive (available as "Kraton™ G-1657 Styrene-ethylene-butylene-styrene (SEBS) Linear Block Copolymer from Shell Chemical Company). The amounts used of each component are reported in Table 6a. For Runs 10–14 a 95.5 parts IOA/4.5 parts AA acrylic adhesive with 0.2% ABP crosslinker made by the process described in U.S. Pat. Nos. 4,737,559 and 4,847,137 was used. The adhesive layer was processed using a 58 mm diameter twin screw extruder with a L:D ratio of 44:1 (available from Crompton & Knowles Corp.). The temperature of the extruder inlet was maintained at 16° C. and the extruder outlet and neck tube temperatures were maintained at 177° C.

The melt streams from the three extruders were combined into one melt stream using a "Cloeren™ Model 92-1033 feedblock" and formed into a film using a Cloeren Epoch die. The feedblock temperature was maintained at 254° C. and the die temperature was maintained at 254° C.

The adhesive was crosslinked by irradiating the tape from the film side using uv curing lamps (available from UVEX Inc., Sunnyvale, Calif.) with a light intensity of 250 millijoules/square cm as measured by a Model M365 UV Radiometer (from Electronic Instrumentation and Technology Inc., Sterling, Va.) in the 320 to 390 nm range.

TABLE 6a

| | Composition | | | | | |
|---|---|---|---|---|---|---|
| | Film Layer | | | Tie Layer | Adhesive Layer | |
| Run Number | Resin 1 (wt. %) | Resin 2[3] (wt. %) | Pigment (wt. %) | Resin[7] (wt. %) | Adhesive 1 (wt. %) | Adhesive 2[10] (wt. %) |
| 1  | 85[1] | 9  | 6[4] | 100 | 100[8]  | 0    |
| 2  | 85[1] | 9  | 6[4] | 100 | 93.7[8] | 6.3  |
| 3  | 85[1] | 9  | 6[4] | 100 | 87.5[8] | 12.5 |
| 4  | 85[1] | 9  | 6[4] | 100 | 100[8]  | 0    |
| 5  | 85[1] | 9  | 6[4] | 100 | 75[8]   | 25   |
| 6  | 85[1] | 9  | 6[4] | 100 | 93.7[8] | 6.3  |
| 7  | 85[1] | 9  | 6[4] | 100 | 75[8]   | 25   |
| 8  | 85[1] | 9  | 6[4] | 100 | 81.3[8] | 18.8 |
| 9  | 85[1] | 9  | 6[4] | 100 | 100[8]  | 0    |
| 10 | 85[1] | 9  | 6[4] | 100 | 100[9]  | 0    |
| 11 | 65[2] | 29 | 6[5] | 100 | 100[9]  | 0    |
| 12 | 65[2] | 29 | 6[6] | 100 | 100[9]  | 0    |
| 13 | 65[2] | 29 | 6[6] | 100 | 100[9]  | 0    |
| 14 | 65[2] | 29 | 6[5] | 100 | 100[9]  | 0    |
| 15 | 85[1] | 9  | 6[4] | 100 | 87.5[8] | 12.5 |
| 16 | 85[1] | 9  | 6[4] | 100 | 87.5[8] | 12.5 |

[1]"PRIMACOR ™ 3340 Ethylene/Acrylic Acid Copolymer" from Dow Chemical Company.
[2]"PRIMACOR ™ 3460 Ethylene/Acrylic Acid Copolymer" from Dow Chemical Company.
[3]"ATTANE ™ 4602 Ethylene/Octene Copolymer" from Dow Chemical Company.
[4]"AEWU-18 Blue Pigment Preblended Concentrate" prepared by Hoechst-Celanese Corp.
[5]"Green Pigment Number 1054" from Hoechst-Celanese Corp.
[6]"Aqua Pigment Number 1053" from Hoechst-Celanese Corp.
[7]"CAPRON ™ XTRAFORM ™ 3839FN Nylon 6/6,6 Nucleated Copolymer" from AlliedSignal Inc.
[8]94 parts IOA/6 parts AA with 0.4% ABP crosslinker made by the process described in U.S. Pat. Nos. 4,737,559 and 4,847,137.
[9]95.5 parts IOA/4.5 parts AA with 0.2% ABP crosslinker made by the process described in U.S. Pat. Nos. 4,737,559 and 4,847,137.
[10]"Kraton ™ G-1657 Styrene-ethylene-butylene-styrene (SEBS) Linear Block Copolymer from Shell Chemical Company.

The lens surface protection tapes were evaluated using the Deblock Test described in Example 1 except that a second set of blocked lens were deblocked after being allowed to set for 24 hours. The tapes were also evaluated for percent haze using the procedures described in Example 4. The results are reported in Table 6b.

TABLE 6b

| Run Number | Target Thickness | | | Deblock Values after: | | Haze (%) |
|---|---|---|---|---|---|---|
| | Outer Film Layer (mm) | Tie Layer (mm) | Adhesive Layer (mm) | 1 hour (cm) | 24 hours (cm) | |
| 1 | 0.064 | 0.006 | 0.051 | 9.3 | 24.6 | 11.6 |
| 2 | 0.064 | 0.006 | 0.051 | 8.5 | 11.9 | 12.9 |
| 3 | 0.064 | 0.006 | 0.051 | 11.0 | 9.3 | 13.8 |
| 4 | 0.064 | 0.006 | 0.051 | 9.3 | 9.3 | — |
| 5 | 0.064 | 0.006 | 0.051 | 11.9 | 8.5 | 15.5 |
| 6 | 0.064 | 0.006 | 0.051 | 10.2 | 8.5 | — |
| 7 | 0.064 | 0.006 | 0.051 | 11.0 | 9.3 | — |
| 8 | 0.064 | 0.006 | 0.051 | 11.0 | 10.2 | 14.9 |
| 9 | 0.064 | 0.006 | 0.051 | 13.5 | 22.0 | 13.2 |
| 10 | 0.038 | 0.003 | 0.025 | 9.3 | 10.2 | — |
| 11 | 0.038 | 0.003 | 0.025 | 62.7 | 50.8 | — |
| 12 | 0.038 | 0.003 | 0.025 | 77.9 | >91.4 | — |
| 13 | 0.064 | 0.003 | 0.051 | 15.7 | 16.9 | 40.5 |
| 14 | 0.064 | 0.003 | 0.051 | 11.4 | 14.4 | — |
| 15 | 0.064 | 0.006 | 0.051 | 11.9 | 11.0 | — |
| 16 | 0.064 | 0.003 | 0.051 | 11.0 | 11.0 | 22.5 |

The tapes were further evaluated for adhesive transfer to glass, two-bond adhesion, adhesion to steel, adhesion to glass, liner release, and mechanical unwind using the procedures described in Example 4. The results are reported in Table 6c.

TABLE 6c

| Run Number | Adhesive Transfer (0 to 10) | 2-Bond Adhesion (g/cm) | Adhesion to Steel (g/cm) | Adhesion to Glass (g/cm) | Liner Release (g/cm) | Unwind (g/cm) |
|---|---|---|---|---|---|---|
| 1 | 0.0 | 699.73 | 180.31 | 346.70 | 37.6 | — |
| 2 | 0.0 | 714.24 | 167.76 | 330.89 | 34.4 | — |
| 3 | 0.1 | 767.03 | 179.35 | 299.98 | 33.9 | — |
| 4 | 0.0 | 715.02 | 195.54 | 356.90 | 20.7 | — |
| 5 | 2.2 | 607.89 | 157.48 | 284.80 | 11.9 | — |
| 6 | 0.7 | 667.37 | 167.97 | 307.68 | 46.8 | — |
| 7 | 1.1 | 607.66 | 155.07 | 261.14 | 10.7 | — |
| 8 | 0.7 | 628.53 | 146.32 | 273.20 | 14.0 | — |
| 9 | 0.1 | 670.49 | 184.38 | 337.03 | 24.6 | — |
| 10 | 0.0 | 598.96 | 87.05 | 209.03 | 22.9 | 107.42 |
| 11 | 0.0 | 589.80 | 91.86 | 218.74 | 20.6 | 131.13 |
| 12 | 0.0 | 592.93 | 159.23 | 194.41 | 6.6 | 124.16 |
| 13 | 0.0 | 624.18 | 98.21 | 263.38 | 6.8 | 164.61 |
| 14 | 0.0 | 630.32 | 107.61 | 282.91 | 8.3 | 174.38 |
| 15 | 1.8 | 645.94 | 138.89 | 260.25 | 22.5 | 117.18 |
| 16 | 0.5 | 631.43 | 118.33 | 232.91 | 19.6 | 110.20 |

An aging study was done to determine the mechanical unwind force for the above protection tapes when wound without liners and stored for up to 102 days at intervals of 17, 31, 45, 63, 80 and 102 days. The results are reported in Table 6d.

TABLE 6d

| Run Number | Unwind After: | | | | | | |
|---|---|---|---|---|---|---|---|
| | 0 days (g/cm) | 17 days (g/cm) | 31 days (g/cm) | 45 days (g/cm) | 63 days (g/cm) | 80 days (g/cm) | 102 days (g/cm) |
| 10 | 107.42 | 110.20 | 115.78 | 118.58 | 118.58 | 117.18 | 117.18 |
| 11 | 131.13 | 132.52 | 133.92 | 136.71 | 139.50 | 139.50 | 140.90 |
| 12 | 124.16 | 128.34 | 131.13 | 136.71 | 138.10 | 139.50 | 142.29 |
| 13 | 164.61 | 172.98 | 174.38 | 182.74 | 182.74 | 182.74 | 188.32 |
| 14 | 174.38 | 182.74 | 184.14 | 192.51 | 191.12 | 189.72 | 196.70 |
| 15 | 117.18 | 113.00 | 122.76 | 129.74 | 132.52 | 138.10 | 140.90 |
| 16 | 110.20 | 115.78 | 117.18 | 122.76 | 122.76 | 128.34 | 132.52 |

EXAMPLE 7

Three layer lens surface protection tapes were made by coextrusion as described in Example 6. The target thickness for the outer film layer, tie layer, and adhesive layer are reported in Table 7a.

The resins used for the outer film layer (skin) were 85 parts "PRIMACOR™ 3340 Ethylene/Acrylic Acid Copolymer" from Dow Chemical Company/9 parts "ATTANE™ 4602 Ethylene/Octene Copolymer" from Dow Chemical Company/6 parts "AEWU-18 Blue Pigment Preblended Concentrate" prepared by Hoechst-Celanese Corp. About 100 pounds of the resin was preblended before putting them in the extruder by weighing them into a fiber drum, capping the drum, and rolling the drum on the floor to mix the resin pellets. The preblended resins were further blended on the twin screw extruder described in Example 6 and the extruder was purged with nitrogen to prevent the E/AA from forming gels. The temperature of the extruder inlet was maintained at 21° C. and the extruder outlet and neck tube temperatures were maintained at 149° C.

The tie layer was made from the same copolymer and was processed in the same manner as described in Example 6.

For Runs 1, 3, 4, and 5 the adhesive layer was a 94 parts IOA/6 parts AA acrylic adhesive with 0.4% ABP crosslinker made by the process described in U.S. Pat. Nos. 4,737,559 and 4,847,137. For Runs 2, 6, 7, and 8 the adhesive layer was a 95.5 parts IOA/4.5 parts AA acrylic adhesive with 0.2% ABP crosslinker made by the process described in U.S. Pat. Nos. 4,737,559 and 4,847,137. The adhesive layer was processed on the twin screw extruder described in Example 6. The temperature of the extruder inlet was maintained at 93° C., the extruder outlet was at 177° C., and the neck tube temperature was maintained at 193° C.

The melt flows from the three extruders were combined into one melt stream and formed into a three layer film with the adhesive layer down as described in Example 6. The film was extruded onto a silicone release liner. The adhesive was crosslinked by irradiating the tape from the film side using uv curing lamps (available from UVEX Inc.) with a light intensity of 250 millijoules/square cm as measured by a Model M365 UV Radiometer (from Electronic Instrumentation and Technology Inc.).

The lens surface protection tapes were evaluated using the Deblock Test described in Example 1 except that a second set of blocked lens were deblocked after being allowed to set for 24 hours. The tapes were also evaluated for percent haze, using the procedures described in Example 4. The results are reported in Table 7a.

TABLE 7a

| | Target Thickness | | | Deblock Values | | |
|---|---|---|---|---|---|---|
| | Outer Film | Tie | Adhesive | after: | | |
| Run Number | Layer (mm) | Layer (mm) | layer (mm) | 1 hour (cm) | 24 hours (cm) | Haze (%) |
| 1 | 0.044 | 0.006 | 0.076 | — | 13.1 | 15.9 |
| 2 | 0.032 | 0.006 | 0.038 | — | 11.4 | — |
| 3 | 0.048 | 0.003 | 0.076 | — | — | — |
| 4 | 0.038 | 0.013 | 0.076 | — | — | — |
| 5 | 0.032 | 0.019 | 0.076 | — | — | — |
| 6 | 0.035 | 0.003 | 0.038 | — | — | — |
| 7 | 0.025 | 0.013 | 0.038 | — | — | — |
| 8 | 0.019 | 0.019 | 0.038 | — | — | — |

Some of the tapes were also evaluated for adhesive transfer to glass, two-bond adhesion, adhesion to steel, adhesion to glass, liner release, and mechanical unwind using the procedures described in Example 4. In addition these tapes were evaluated for holding power as described in Example 5. The results are reported in Table 7b.

TABLE 7b

| Run Number | Adhesive Transfer (0 to 10) | 2-Bond Adhesion (g/cm) | Adhesion to Steel (g/cm) | Adhesion to Glass (g/cm) | Holding Power (hours) | Liner Release (g/cm) | Unwind (g/cm) |
|---|---|---|---|---|---|---|---|
| 1 | 0 | 620.50 | 155.12 | 286.81 | >169 | 2.7 | 160.15 |
| 2 | 0 | 534.56 | 107.74 | 187.49 | >169 | 2.4 | — |

Adhesion To Lens

The tape made in Run 1 was further evaluated for adhesion to various types of commercially available lens. A 2.54 cm wide strip of the lens surface protection tape was applied to the lenses described in Table 7c. Approximately 15 cm of the strip of tape was allowed to hang over the edge of the lens. A piece of film was placed over the strip of tape and the lens in order to use the blocker (commercially available as OPTEK™ Model 200 Blocker). Air pressure was set at 0.02–0.03 MPa (3–5 psi) for the blocker. After 2 hours the tape was removed from the lens using the "Slip/Peel Tester SP 102B3M90" by fastening the hanging portion of the strip of tape in the platten of the tester. A two second averaging time and a platten speed of 228.6 cm per minute were used. The force to peel the tape from the lens was reported in grams per cm. The results are reported in Table 7c.

TABLE 7c

| Lens No. | Source, Address | Trade Name | Description | Size/Base | Adhesion (g/cm) |
|---|---|---|---|---|---|
| A | SOLA Optical USA, Inc., Petaluma, CA | PERMA-GARD ™ | Hard Resin, Semi-Finished | 76 mm 0.50 | 316.94 |
| B | Gentex Optics, Inc., Dudley, MA | GENTEX ™ with PDQ ™ | Semi-Finished, Single Vision, Coated Polycarbonate | 70 mm 0.75 | 189.72 |
| C | Pentax Vision, Inc., Hopkins, MN | CLEARCOAT ™ II with Pentax E-Z Clean ™ PENTAX POLY LITE ™ AR | Polycarbonate F.S.V Scratch Resistant | 75 mm −4.00/ −0.00 | 133.92 |
| D | Silor, Division of Essilor of America, Inc., St. Petersburg, FL | Super Shield ™ Coated | Semi-Finished, Single Vision | 70 mm 1.00 | 168.52 |
| E | VISION-EASE, A Unit of BMC Industries, Inc., St. Cloud, MN | VERSALITE ™ | Semi-Finished, Single Vision, High-Indes Polycarbonate | 71 mm 0.50 | 318.06 |
| F | Rodenstock, Germany | COSMOLIT 1.5 | White, Hard-Resin, Single Vision, Semi-Finished | 74 mm 4.0/ E.0 | 382.79 |
| G | Optima Inc., Stratford, CT | HYPER index 160 ™ | Single Vision | 77 mm 0.50 | 270.07 |
| H | Optical Radiation Corporation, Azusa, CA | ORCOLITE ™ POLY Tx3 ™ | Semi-Finished, Single Vision, Polycarbonate | 76 mm 0.50 | 161.82 |
| I | Pentax Vision, Inc., Hopkins, MN | CLEARCOAT ™ II with Pentax E-Z Clean ™ Ultra AR | Plastic F.S.V Scratch Resistant | 75 mm −4.00/ −0.00 | 152.89 |
| J | Seiko Optical Products, Mahwah, | Diacoat II | Hard Coated, Plastic Lens Blank, | 70 mm 0.50 | 276.77 |

TABLE 7c-continued

| Lens No. | Source, Address | Trade Name | Description | Size/Base | Adhesion (g/cm) |
|---|---|---|---|---|---|
| | NJ | | Semi-Finished, Single Vision | | |
| K | Signet Armorlite, Inc., San Marcos, CA | RLX Plus ™ | Scratch Resistant, Finished Lens in Hard Resin, Rapid Consistent Tinting with Double-sided Protection, Single Vision | 70 mm 0.00 | 271.19 |

The tape made in Run 1 and a Comparison Tape A (commercially available as Venture Tape from Venture Tape Corporation, Rockland, Mass.) were evaluated for Edge Lift by the method described below.

EDGE LIFT TEST

Lens Surface Protection Tapes were applied to lenses commercially available from Signet Armorlite, Inc (made using CR-39 plastic from PPG). The Signet Armorlite lenses had bases of 0.00, 6.25, 8.25, 10.00, 10./4.00, and Progressive which means the curvature of the lens varies. The lens surface protection tapes were applied to two lenses of each base using the 3M SURFACE SAVER Applicator with an air pressure setting of 0.28 MPa. A 7 mm lens blank was used beneath each lens for added height while applying tape and the edges of the tapes were smoothed by hand after the application. The maximum distance the tape gaps from the edge of the lens measured toward the center of each lens blank was recorded in millimeters. The results are reported in Table 7d for an average of two lenses of each base with from 4 to 20 measurements per lens.

TABLE 7d

| | Width of Tape Gap from Edge of Lens Blank for Armorlite Lens of base: | | | | | |
|---|---|---|---|---|---|---|
| Run Number | 0.00 | 6.25 | 8.25 | 10.00 | 10./4.00 | Progressive |
| 1 | 5.0 | 5.5 | 9.5 | 11.0 | 11.5 | 9.0 |
| Comparison Tape A | 9.5 | 10.5 | 17.0 | 21.0 | 20.0 | 14.0 |

The tape from Run 1 had better conformability to the various lens curvatures than the comparison tape.

Elastic Recovery and Stress Retention

The Elastic Recovery and Stress Retention of the film was determined using ASTM D 4649-87, Annex A13 "Test Method for Elastic Recovery and Permanent Deformation and Stress Retention of Plastic Films" for Type I Materials using an "INSTRON™ Model No. 1122 Tensile Tester". Four 25 mm wide by 175 mm long specimens were cut from each direction (machine and transverse). The initial grip separation was 50.8 mm. The thickness of each specimen was measured and recorded. Elastic recovery was measured by elongating the specimen at a rate of 12.5 mm/min to an extension of 100%, holding the stretch for 1 minute, returning the crosshead to the original grip separation at a rate of 12.5 mm/min, allowing the specimen to relax for 3 minutes, and re-elongating to 100%. Percent elastic recovery was calculated by dividing the amount of extension recording a load during the second elongation by the amount of extension recording a load during the first elongation and multiplying by 100. Percent stress retention was calculated by dividing the load needed to perform the second elongation by the load needed to perform the first elongation and multiplying by 100. The results are reported in Table 7e for various examples and comparison tapes and in Table 7f for the runs of Example 7.

TABLE 7e

| Example Number/ Run Number | Elastic Recovery Machine Direction (%) | Stress Retention Machine Direction (%) |
|---|---|---|
| Example 4/Run 7 | 84 | 66 |
| Example 5/Run 14 | 28 | 50 |
| Example 6/Run 11 | 79 | 63 |
| Example 6/Run 15 | 79 | 64 |
| Example 6/Run 16 | 82 | 68 |
| Example 5/Run 14 Pressure Laminated to Example 4/Run 7 | 55 | 56 |
| Example 5/Run 14 Pressure Laminated to Example 2/Run 12 | 73 | 60 |
| Comparison Tape B[1] | 75 | 77 |
| Comparison Tape C[2] | 86 | 72 |
| Comparison Tape D[3] | 84 | 72 |
| Comparison Tape E[4] | 75 | 67 |

[1]"SURFACE SAVER ™ 1641 Lens Surfacing System" available from 3M Company.
[2]"CERIGUARD 660" available from Cerium Optical Products, Tenterden, Kent, England.
[3]"VENTURE TAPE ™ 455" available from Venture Tape Corp.
[4]"VENTURE TAPE ™ 454" available from Venture Tape Corp.

TABLE 7f

| | Elastic Recovery | | Stress Retention | |
|---|---|---|---|---|
| Run Number | Machine Direction (%) | Cross Machine Direction (%) | Machine Direction (%) | Cross Machine Direction (%) |
| 1 | 76.0 | 76.3 | 63.3 | 64.3 |
| 2 | 72.6 | 73.0 | 64.0 | 61.3 |
| 3 | 83.7 | 81.3 | 66.7 | 64.7 |
| 4 | 67.0 | 68.3 | 60.0 | 57.3 |
| 5 | 63.3 | 63.5 | 56.7 | 53.0 |
| 6 | 74.7 | 75.0 | 63.7 | 66.3 |
| 7 | 64.3 | 61.5 | 59.3 | 54.5 |
| 8 | 57.0 | 56.7 | 53.0 | 52.3 |

EXAMPLE 8

Three layer lens surface protection tapes were made by coextrusion as described in Example 6.

The resins used for the film layer (skin) were 85 parts "PRIMACOR™ 3340 Ethylene/Acrylic Acid Copolymer" from Dow Chemical Company; 8 parts "ATTANE™ 4602 Ethylene/Octene Copolymer" from Dow Chemical Company; and 7 parts "AEWU-18 Blue Pigment Preblended Concentrate" prepared by Hoechst-Celanese Corp. About 100 pounds of the resin was preblended (i.e., before putting them in the extruder) by weighing the resins into a fiber drum, capping the drum, and rolling the drum on the floor to mix the resin pellets. The preblended resins were further blended on the twin screw extruder described in Example 6 and the extruder was purged with nitrogen to prevent the E/AA from forming gels. The temperature of the extruder inlet was maintained at 21° C. and the extruder outlet and neck tube temperatures were maintained at 149° C. The target film layer caliper for Runs 1 and 3 was 0.044 mm and for Run 2 was 0.032 mm.

For Runs 1 and 2 the tie layer was made from the same copolymer and was processed in the same manner as described in Example 6. For Run 3 the tie layer was made from an adhesive grade thermoplastic polyamide resin based on dimerized fatty acids commercially available as UNI-REZ™ 2636" from Union Camp Corporation, Chemical Products Division, Jacksonville, Fla. The target tie layer caliper for Runs 1–3 was 0.006 mm.

For Runs 1 and 3 the adhesive layer was a 94 parts IOA/6 parts AA acrylic adhesive with 0.4% ABP crosslinker made by the process described in U.S. Pat. Nos. 4,737,559 and 4,847,137. For Run 2 the adhesive layer was a 95.5 parts IOA/4.5 parts AA acrylic adhesive with 0.3% ABP crosslinker made by the process described in U.S. Pat. Nos. 4,737,559 and 4,847,137. The adhesive layer was processed on the twin screw extruder described in Example 6. The temperature of the extruder inlet was maintained at 93° C., the extruder outlet was at 177° C., and the neck tube temperature was at 193° C.

The melt streams from the three extruders were combined into one melt stream and formed into a three layer film with the adhesive layer down as described in Example 6. The film was extruded onto a silicone release liner. The adhesive was crosslinked by irradiating the tape from the film side using uv curing lamps (available from UVEX Inc.) with a light intensity of 300 millijoules/square cm as measured by a Model M365 UV Radiometer (from Electronic Instrumentation and Technology Inc.) for Runs 1 and 3 and with a light intensity of 250 millijoules/square cm for Run 2. The target caliper for the adhesive for Runs 1 and 3 was 0.076 mm and for Run 2 was 0.038 mm.

The tape of Run 1 was evaluated for deblock force using the Deblock Test described in Example 1 except that a second set of blocked lens were deblocked after being allowed to set for 24 hours. Percent haze of this tape was determined using the test method described in Example 4. The results of these measurements are reported in Table 8a.

TABLE 8a

| Run Number | Deblock Values after: | | Haze (%) |
|---|---|---|---|
| | 1 hour (cm) | 24 hours (cm) | |
| 1 | 33.0 | 32.5 | 15.7 |

The tapes of Run 3 and Run 1 were evaluated for adhesive transfer to glass, or two-bond adhesion, adhesion to steel, adhesion to glass, and mechanical unwind using the procedures described in Example 4. The results are reported in Table 8b.

TABLE 8b

| Run Number | Adhesive Transfer (0 to 10) | 2-Bond Adhesion (g/cm) | Adhesion to Steel (g/cm) | Adhesion to Glass (g/cm) | Unwind (g/cm) |
|---|---|---|---|---|---|
| 1 | — | 545.72 | 139.5 | 280.12 | 172.28 |
| 3 | 0 | — | — | — | — |

EXAMPLE 9

Three layer lens surface protection tapes were made by coextrusion as described in Example 6.

The resins used for the film layer (skin) comprised 80 parts "PRIMACOR™ 3340 Ethylene/Acrylic Acid Copolymer" from Dow Chemical Company; 13 parts "ATTANE™ 4602 Ethylene/Octene Copolymer" from Dow Chemical Company; and 7 parts "AEWU-18 Blue Pigment Preblended Concentrate" prepared by Hoechst-Celanese Corp. About 100 pounds of the resin was preblended (i.e., before putting them in the twin screw extruder) by using the resin feeders on the single screw extruder used in Example 6 for extruding the tie layer. The resins were fed into a large cardboard box instead of the extruder. The preblended resins were further blended on the twin screw extruder described in Example 6 and the extruder was purged with nitrogen to prevent the E/AA from forming gels. The temperature of the extruder inlet was maintained at 37° C. and the extruder outlet and neck tube temperatures were maintained at 149° C. The target film layer caliper was 0.044 mm.

The tie layer for Runs 1–8 was made from a nylon resin commercially available as "GRILON™ CF6S Nylon 6/12 Copolymer" from EMS-American Grilon Inc., Sumter, S.C.. The nylon 6/12 copolymer resin has a lower melting point than the nylon 6/6,6 copolymer. The tie layer for Run 9 was made from an 80/20 blend of the nylon 6/12 copolymer resin (from EMS-American Grilon Inc.) and a thermoplastic polyamide adhesive resin (commercially available as UNI-REZ™ X35-643-40" from Union Camp Corporation. The tie layer was extruded using the single screw extruder described in Example 6. However, the temperature of the extruder inlet was maintained at 60° C. and the extruder outlet and neck tube temperatures were maintained at 193° C. The target tie layer caliper for Runs 1–7, and 9 was 0.006 mm. The target tie layer caliper for Run 8 was 0.003 mm.

The adhesive layer was a 94 parts IOA/6 parts AA acrylic adhesive with 0.4% ABP crosslinker made by the process described in U.S. Pat. Nos. 4,737,559 and 4,847,137. The adhesive layer was processed on the twin screw extruder described in Example 6. The temperature of the extruder inlet was maintained at 93° C., the extruder outlet was at 149° C., and the neck tube temperature was maintained at 166° C.

The melt flows from the three extruders were combined into one melt stream and formed into a three layer film as described in Example 6. However, the feedblock and the die temperature were maintained at 177° C., and the tape was extruded with the film layer against a steel casting roll and the adhesive layer up. The temperature of the steel casting roll was varied for each run as shown in Table 9a. No release liner was used in processing this tape. The adhesive was crosslinked by irradiating the tape from the adhesive side using uv curing lamps (available from UVEX Inc.) with the light intensity as measured by a Model M365 UV Radiometer (from Electronic Instrumentation and Technology Inc.) and reported in Table 9a. The target caliper for the adhesive was 0.076 mm.

The tapes were evaluated for deblock force using the Deblock Test described in Example 1. Percent haze was determined using the Haze Test described in Example 4. The results are reported in Table 9a.

TABLE 9a

| Run Number | Casting Roll Temperature (° C.) | Light Intensity (mJ/cm²) | Deblock Values after: 1 hour (cm) | 24 hours (cm) | Haze (%) |
|---|---|---|---|---|---|
| 1 | 60 | 150 | 43.2 | 62.7 | 16.4 |
| 2 | 60 | 100 | >50.0 | >61.0 | — |
| 3 | 60 | 200 | 30.5 | 47.4 | — |
| 4 | 49 | 200 | 50.8 | >83.0 | — |
| 5 | 38 | 200 | 69.4 | 52.5 | 18.9 |
| 6 | 27 | 200 | >86.4 | >91.4 | — |
| 7 | 16 | 200 | 77.5 | >91.4 | 19.4 |
| 8 | 16 | 50 | >91.4 | >91.4 | — |
| 9 | 16 | 100 | >73.7 | >91.4 | 20.2 |

The tapes were further evaluated for adhesive transfer to glass, two-bond adhesion, and mechanical unwind using the procedures described in Example 4. In addition these tapes were evaluated for holding power as described in Example 5. The results are reported in Table 9b.

TABLE 9b

| Run Number | Adhesive Transfer (0 to 10) | 2-Bond Adhesion (g/cm) | Holding Power (hours) | Unwind (g/cm) |
|---|---|---|---|---|
| 1 | 0 | 510.38 | >166 | 118.58 |
| 2 | 0 | 515.22 | — | 134.85 |
| 3 | 0 | 501.46 | — | 108.81 |
| 4 | 0 | 507.78 | — | — |
| 5 | 0 | 495.13 | — | — |
| 6 | 0 | 496.25 | — | — |
| 7 | 0 | 496.06 | — | — |
| 8 | 0 | 560.98 | -31.62 | 126.48 |
| 9 | 0 | 491.78 | — | — |
| Comp. Tape L[1] | 0 | — | — | Ranges from 167 to 223 |

[1]"SURFACE SAVER ™ 1640 Lens Surfacing System" available from 3M Company.

The tape made in Run 1, and selected tapes made in previous examples as well as several comparison tapes were evaluated for Edge Lift by the method described in Example 7 except only two different base curvatures were used. In addition the comparison tapes were evaluated with selected tapes made in this and previous examples using the methods described in Example 4 for Adhesive Transfer and Two-Bond Adhesion. The results are reported in Table 9c.

TABLE 9c

| Example No./ Run No. | Thickness (mm) | Edge Lift Width of Tape Gap on Armorlite Lens with Base: 6.25 | 8.25 | Adhesive Transfer (0–10) | 2-Bond Adhesion (g/cm) |
|---|---|---|---|---|---|
| Example 4/Run 7 | 0.127 | 3.8 | 7.6 | 0.0 | 561.35 |
| Example 5/Run 3 | 0.127 | 3.0 | 4.0 | 0.8 | 532.08 |
| Example 6/Run 1 | 0.127 | 4.8 | 11.6 | 0.0 | 699.73 |
| Example 7/Run 1 | 0.127 | 6.4 | 8.2 | 0.0 | 620.50 |
| Example 8/Run 1 | 0.127 | 4.1 | 7.6 | — | 545.72 |
| Example 9/Run 1 | 0.127 | 6.7 | 10.3 | 0.0 | 510.38 |
| Comparison Tape D[1] | 0.135 | 9.9 | 14.1 | 0.0 | 700.85 |
| Comparison Tape E[2] | 0.147 | 6.6 | 11.9 | 0.3 | 691.92 |
| Comparison Tape F[3] | 0.097 | 10.8 | 18.0 | 0.0 | 467.60 |
| Comparison Tape G[4] | 0.127 | 5.0 | 9.4 | 0.0 | 632.77 |
| Comparison Tape H[5] | — | 6.1 | 11.3 | 0.0 | 650.63 |
| Comparison Tape I[6] | 0.104 | 6.1 | 9.2 | 10.0 | 553.54 |
| Comparison Tape J[7] | 0.135 | 4.8 | 12.1 | 0.0 | 662.90 |
| Comparison Tape K[8] | 0.102 | 3.3 | 5.8 | 0.3 | 647.28 |

[1]"VENTURE TAPE ™ 455" available from Venture Tape Corp.
[2]"VENTURE TAPE ™ 454" available from Venture Tape Corp.
[3]"NITTO TAPE" available from Nitto Denko Corp., Osaka, Japan.
[4]"CERIUM TAPE" available from Cerium Optical Products.
[5]"EUROLENS TAPE" available from Hi Tech Electronics, Clearwater, FL.
[6]"ECONOBLUE ™ TAPE" available from Econo-O-Cloth Inc., Lansing, MI.
[7]"VENTURE TAPE ™ 456" available from Venture Tape Corp.
[8]"VENTURE TAPE ™ 457" available from Venture Tape Corp.

EXAMPLE 10

Three layer lens surface protection tapes were made by coextrusion as described in Example 6.

The resins used for the film layer (skin) comprised "PRIMACOR™ 3340 Ethylene/Acrylic Acid Copolymer" from Dow Chemical Company; "ATTAME™ 4602 Ethylene/Octene Copolymer" from Dow Chemical Company; and "AEWU-18 Blue Pigment Preblended Concentrate" prepared by Hoechst-Celanese Corp., Specialty Chemical Group. The amount of resins and pigment used for each run are described in Table 10a. These resins were blended using the twin screw extruder described for Example 6. The temperature of the extruder inlet was maintained at 21° C. and the extruder outlet and neck tube temperatures were maintained at 160° C. The target film layer caliper was 0.044 mm.

The tie layer for Runs 1–5 was made from a nylon resin commercially available as "GRILON™ CF62BSE Nylon 6/6,9 Copolymer" from EMS-American Grilon Inc. The nylon 6/6,9 copolymer resin has a lower melting point than the nylon 6/6,6 copolymer and the nylon 6/12 copolymer. The tie layer for Run 6 was made from an 95/5 blend of the nylon 6/6,9 copolymer resin (from EMS-American Grilon Inc.) and a thermoplastic polyamide adhesive resin (commercially available as UNI-REZ™ X35-643-40" from Union Camp Corporation). The tie layer was extruded using the single screw extruder described in Example 6. However, the temperature of the extruder inlet was maintained at 60°

C. and the extruder outlet and neck tube temperatures were maintained at 193° C. The target tie layer caliper was 0.006 mm.

The adhesive layer was a 94 parts IOA/6 parts AA acrylic adhesive with 0.4% ABP crosslinker made by the process described in U.S. Pat. Nos. 4,737,559 and 4,847,137. The adhesive layer was processed on the twin screw extruder described in Example 6. The temperature of the extruder inlet was maintained at 93° C., the extruder outlet was at 149° C., and the neck tube temperature was maintained at 177° C.

The melt flows from the three extruders were combined into one melt stream and formed into a three layer film as described in Example 6. However, the feedblock and the die temperature were maintained at 177° C. and the tape was extruded with the film layer against a steel casting roll and the adhesive layer up. The temperature of the casting roll was varied for each run as shown in Table 10a. No release liner was used in processing these tapes. The adhesive was crosslinked by irradiating the tape from the adhesive side using uv curing lamps (available from UVEX Inc.) with the light intensity of 150 mJ/cm$^2$ as measured by a Model M365 UV Radiometer (from Electronic Instrumentation and Technology Inc.). The target caliper for the adhesive was 0.076 mm.

TABLE 10a

| Run Number | Casting Roll Temperature (° C.) | Resin 1[1] (wt. %) | Resin 2[2] (wt. %) | Pigment[3] (wt. %) |
|---|---|---|---|---|
| 1 | 18 | 80 | 13 | 7 |
| 2 | 18 | 60 | 33 | 7 |
| 3 | 96 | 50 | 43 | 7 |
| 4 | 96 | 40 | 53 | 7 |
| 5 | 96 | 20 | 73 | 7 |
| 6 | 96 | 40 | 53 | 7 |

[1]"PRIMACOR ™ 3340 Ethylene/Acrylic Acid Copolymer" from Dow Chemical Company.
[2]"ATTANE ™ 4602 Ethylene/Octene Copolymer" from Dow Chemical Company.
[3]"AEWU-18 Blue Pigment Preblended Concentrate" prepared by Hoechst-Celanese Corp., Specialty Chemical Group.

The tapes were evaluated for deblock force using the Deblock Test described in Example 1, for percent haze using the Haze Test described in Example 4 and for Edge Lift by the method described in Example 7 except only two different base curvatures of lenses were used. The results are reported in Table 10b.

TABLE 10b

| | Deblock Values after: | | | Edge Lift Width of Tape Gap on | |
|---|---|---|---|---|---|
| Run Number | 1 Hour (cm) | 24 Hours (cm) | Haze (%) | Armorlite Lens with Base: 6.25 | 8.25 |
| 1 | 12.7 | 78.7 | 23.8 | 7.4 | 10.1 |
| 2 | 25.4 | 88.9 | 24.5 | 6.7 | 11.3 |
| 3 | 15.2 | 15.2 | — | 8.6 | 12.0 |
| 4 | 12.7 | 17.8 | 17.1 | 8.4 | 9.9 |
| 5 | 17.8 | 25.4 | 17.6 | 8.2 | 9.7 |
| 6 | 12.7 | 16.0 | 16.8 | 6.6 | 8.9 |

TABLE 10b-continued

| | Deblock Values after: | | | Edge Lift Width of Tape Gap on | |
|---|---|---|---|---|---|
| Run Number | 1 Hour (cm) | 24 Hours (cm) | Haze (%) | Armorlite Lens with Base: 6.25 | 8.25 |
| Comp. Tape B[1] | — | — | — | 7.1 | 13.3 |

[1]"SURFACE SAVER ™ 1641 Lens Surfacing System" available from 3M Company.

The tapes were further evaluated for adhesive transfer to glass, two-bond adhesion, adhesion to glass, adhesion to steel, and mechanical unwind using the procedures described in Example 4 and for holding power as described in Example 5. The results are reported in Table 10c.

TABLE 10c

| Run Number | Adhesive Transfer (0–10) | 2-Bond Adhesion (g/cm) | Adhesion to Glass (g/cm) | Adhesion to Steel (g/cm) | Unwind (g/cm) | Holding Power (hours) |
|---|---|---|---|---|---|---|
| 1 | 0 | 526.38 | 165.54 | 66.96 | 96.72 | 166 |
| 2 | 0 | 533.82 | 138.76 | 70.68 | 119.97 | 166 |
| 3 | 0 | 531.59 | 132.80 | 74.40 | 93.93 | 166 |
| 4 | 0 | 517.82 | 118.67 | 107.88 | 97.65 | 166 |
| 5 | 0 | 519.31 | 146.94 | 93.00 | 114.39 | 166 |
| 6 | 0 | 522.29 | 156.24 | 96.72 | 121.83 | 166 |
| Comp. Tape B[1] | 0 | 581.44 | 558.74 | 375.72 | — | 166 |

[1]"SURFACE SAVER ™ 1641 Lens Surfacing System" available from 3M Company

EXAMPLE 11

Three layer lens surface protection tapes were made by coextrusion as described in Example 6.

The resins used for the film layer (skin) comprised "PRIMACOR™ 3340 Ethylene/Acrylic Acid Copolymer" from Dow Chemical Company; "ATTANE™ 4602 Ethylene/Octene Copolymer" from Dow Chemical Company; "ASPUN™ 6806 Linear Low Density Polyethylene from Dow Chemical Company; and "AEWU-18 Blue Pigment Preblended Concentrate" prepared by Hoechst-Celanese Corp., Specialty Chemical Group. The amount of resins and pigment used for each run are described in Table 11a. These resins were blended using the twin screw extruder described for Example 6. The temperature of the extruder inlet was maintained at 21° C. and the extruder outlet and neck tube temperatures were maintained at 160° C.

The tie layer for Runs 1–10 and 12 was made from a nylon resin commercially available as "GRILON™ CF62BSE Nylon 6/6,9 Copolymer" from EMS-American Grilon Inc. The tie layer for Run 11 was made from a blend of 97 parts nylon resin commercially available as "GRILON™ CF62BSE Nylon 6/6,9 Copolymer" from EMS-American Grilon Inc with 3 parts BYNEL E374. Alternatively, one might blend 3 to 20 percent by weight SURLYN 1702, ELVAX 660, or ESTANE 58309 in place of the BYNEL. The tie layer was extruded using the single screw extruder described in Example 6. However, the temperature of the extruder inlet was maintained at 60° C. and the extruder outlet and neck tube temperatures were maintained at 193° C.

The adhesive layer was a 94 parts IOA/6 parts AA acrylic adhesive with 0.4% ABP crosslinker made by the process described in U.S. Pat. Nos. 4,737,559 and 4,847,137. The adhesive layer was processed on the twin screw extruder described in Example 6. The temperature of the extruder inlet was maintained at 93° C., the extruder outlet was at 149° C., and the neck tube temperature was maintained at 177° C.

The melt flows from the three extruders were combined into one melt stream and formed into a three layer film as described in Example 6. However, the feedblock and the die temperature were maintained at 177° C. and the tape was extruded with the film layer against a steel casting roll and the adhesive layer up. The temperature of the casting roll was as shown in Table 11a. No release liner was used in processing these tapes. The adhesive was crosslinked by irradiating the tape from the adhesive side using uv curing lamps (available from UVEX Inc.) with the light intensity of 62 mJ/cm$^2$ (for Runs 1–11) and 100 mJ/cm$^2$ (for Run 12) as measured by a Model M365 UV Radiometer (from Electronic Instrumentation and Technology Inc.).

The target caliper for the film, tie, and adhesive layers is listed in Table 11b.

TABLE 11a

| Run Number | Casting Roll Temperature (° C.) | Resin 1[1] (wt. %) | Resin 2[2] (wt. %) | Resin 3[3] (wt. %) | Pigment[4] (wt. %) |
|---|---|---|---|---|---|
| 1 | 60 | 30 | 63 | 0 | 7 |
| 2 | 60 | 20 | 73 | 0 | 7 |
| 3 | 60 | 10 | 83 | 0 | 7 |
| 4 | 60 | 40 | 43 | 10 | 7 |
| 5 | 60 | 40 | 33 | 20 | 7 |
| 6 | 60 | 40 | 23 | 30 | 7 |
| 7 | 60 | 40 | 13 | 40 | 7 |
| 8 | 60 | 40 | 43 | 10 | 7 |
| 9 | 60 | 40 | 23 | 30 | 7 |
| 10 | 60 | 15 | 79 | 0 | 6 |
| 11 | 60 | 40 | 14 | 40 | 6 |
| 12 | 60 | 15 | 69 | 10 | 6 |

[1]"PRIMACOR ™ 3340 Ethylene/Acrylic Acid Copolymer" from Dow Chemical Company.
[2]"ATTANE ™ 4602 Ethylene/Octene Copolymer" from Dow Chemical Company.
[3]"ASPUN ™ 6806 LLDPE from Dow Chemical Company.
[4]"AEWU-18 Blue Pigment Preblended Concentrate" prepared by Hoechst-Celanese Corp., Specialty Chemical Group.

TABLE 11b

| Run Number | Film layer target caliper (mm) | Tie layer target caliper (mm) | Adhesive layer target caliper (mm) |
|---|---|---|---|
| 1 | 0.044 | 0.00635 | 0.076 |
| 2 | 0.0476 | 0.00318 | 0.076 |
| 3 | 0.0476 | 0.00318 | 0.076 |
| 4 | 0.0476 | 0.00318 | 0.076 |
| 5 | 0.038 | 0.0127 | 0.076 |
| 6 | 0.038 | 0.0127 | 0.076 |
| 7 | 0.0476 | 0.00318 | 0.076 |
| 8 | 0.0476 | 0.00318 | 0.076 |
| 9 | 0.0476 | 0.00318 | 0.076 |
| 10 | 0.0476 | 0.00318 | 0.076 |

TABLE 11b-continued

| Run Number | Film layer target caliper (mm) | Tie layer target caliper (mm) | Adhesive layer target caliper (mm) |
|---|---|---|---|
| 11 | 0.0476 | 0.00318 | 0.076 |
| 12 | 0.0476 | 0.00318 | 0.076 |

The tapes were evaluated for deblock force using the Deblock Test described in Example 1 and for Edge Lift by the method described in Example 7 except only one base curvature of lenses was used. The results are reported in Table 11c.

TABLE 11c

| Run Number | Deblock Values after: 1 Hour (cm) | Deblock Values after: 24 Hours (cm) | Edge Lift Width of Tape Gap (mm) on Armorlite Lens with Base: 6.25 |
|---|---|---|---|
| 3 | 8.89 | 11.43 | 6.8 |
| 5 | 13.97 | 19.05 | 7.2 |
| 6 | 11.43 | 19.05 | 7.9 |
| 8 | 27.94 | 25.4 | 7.2 |
| 9 | 10.16 | 11.43 | 7.4 |
| 10 | 16.51 | 19.05 | 7.1 |
| 11 | 8.89 | 10.16 | 8.8 |
| 12 | 16.51 | 13.97 | 7.3 |

The tapes were further evaluated for adhesion to glass and adhesive transfer using the procedures described in Example 4. The results are reported in Table 11d.

TABLE 11d

| Run Number | Adhesion to Glass (g/cm) | Adhesive transfer |
|---|---|---|
| 3 | 223 | 0 |
| 5 | 229 | 0 |
| 6 | 207.8 | 0 |
| 8 | 221 | 0 |
| 9 | 205.5 | 0 |
| 10 | 206.6 | 0 |
| 11 | 218.9 | 0 |
| 12 | 189.9 | 0 |

Various modifications and alterations of this invention will be apparent to those skilled in the art without departing from the scope and spirit of this invention, and it should be understood that this invention is not limited to the illustrative embodiments set forth herein.

What is claimed is:

1. A method of adhering a lens block to a compound surface of an ophthalmic lens blank, comprising the steps of:
   applying the pressure-sensitive adhesive portion of a section of a conformable tape to the entirety of a compound surface of an ophthalmic lens blank, wherein the tape comprises a polymer backing having a first and a second major surfaces; and a pressure-sensitive adhesive on the second major surface of the polymer backing, wherein the tape is wound into a roll without a liner and exhibits a maximum unwind force of less than 165 g/cm width;
   conforming the tape to the surface so that the tape is essentially free from wrinkles, air bubbles and other discontinuities in the bond between the tape and the lens blank; and applying a lens block to at least a portion of the polymer backing layer of the tape.

2. The method according to claim 1, wherein the polymer backing has a first major surface comprising an olefin moiety and an acid moiety.

3. The method according to claim 1, wherein the polymer backing has a first major surface comprising a blend of an olefin polymer with a polymer having acidic functionality.

4. The method according to claim 3, wherein the blend comprises between 30 and 50 weight percent of the acidic functional polymer.

5. The method according to claim 3, wherein the olefin polymer is selected from the group consisting of polyethylene, polypropylene, polybutylene, copolymers of ethylene with octene, chlorinated polyethylene, copolymers of ethylene with vinyl acetate, copolymers of ethylene with ethyl acrylate, and olefinic ionomer resins; and the polymer having acidic functionality is a copolymer of an olefin monomer with an acid moiety selected from the group consisting of acrylic acid, methacrylic acid, and maleic anhydride.

6. The method according to claim 1, wherein the polymer backing has a first major surface of a copolymer of an olefin monomer with a monomer having pendant acidic functionality.

7. The method according to claim 6, wherein the olefin monomer is selected from the group consisting of substituted and unsubstituted ethylene, propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, and 1-isodecene; and the monomer having pendant acidic functionality is selected from the group consisting of acrylic acid, methacrylic acid, and maleic anhydride.

8. The method according to claim 6, wherein the polymer backing has a first major surface comprising a blend of a polyamide polymer with the copolymer.

9. The method according to claim 1, wherein the polymer backing is a multilayered backing comprising an outer surface layer of a polymer composition having an olefin moiety and an acid moiety, and a core layer of a polymer selected from the group consisting of olefin polymers, ethylene vinyl acetate copolymers, ethylene methylacrylate copolymers, ethylene ethylacrylate copolymers, ethylene acrylic acid copolymers, vinyl polymers, urethane polymers, polyester films, ionomer polymers, maleic anhydride/acrylic acid graft copolymers with ethylene vinyl acetate copolymer, maleic anhydride/acrylic acid graft copolymers with ethyl acrylate, maleic anhydride/acrylic acid graft copolymers with polyethylene, maleic anhydride/acrylic acid graft copolymers with polypropylene; and polyamide films.

10. The method according to claim 1, wherein the tape has a stress retention value less than 70%.

11. The method according to claim 1, wherein the tape has a stress retention value less than 60%.

12. The method according to claim 1, wherein the tape exhibits edge lift of less than 12 mm when tested using a lens having a base of 8.25.

13. The method according to claim 1, wherein the tape exhibits edge lift of less than 9 mm when tested using a lens having a base of 8.25.

14. The method according to claim 1, wherein the polymer backing is non-tacky to the touch.

15. The method according to claim 1, wherein the roll of tape which has been stored for at least 99 days at 21° C. exhibits a maximum unwind force of less than 180 g/cm width.

16. The method according to claim 1, wherein the polymer backing has a total thickness less than 0.1 mm, and the amount of adhesive on the backing is between 7 and 80 g/m$^2$.

17. The method according to claim 1, wherein the polymer backing is a multilayered backing comprising an outer surface layer of a polymer composition having an olefin moiety and an acid moiety, and a core layer of a nylon polymer.

18. The method according to claim 1, wherein the tapes provide a deblock value between 5 and 56 cm.

19. A method of adhering a lens block to a compound surface of an ophthalmic lens blank, comprising the steps of:

applying the pressure-sensitive adhesive portion of a section of a conformable tape to the entirety of a compound surface of an ophthalmic lens blank, wherein the tape comprises a multilayered backing comprising an outer surface layer of a polymer composition having an olefin moiety and an acid moiety, and a core layer of a polymer selected from the group consisting of olefin polymers, ethylene vinyl acetate copolymers, ethylene methylacrylate copolymers, ethylene ethylacrylate copolymers, ethylene acrylic acid copolymers, vinyl polymers, urethane polymers, polyester films, ionomer polymers, maleic anhydride/acrylic acid graft copolymers with ethylene vinyl acetate copolymer, maleic anhydride/acrylic acid graft copolymers with ethyl acrylate, maleic anhydride/acrylic acid graft copolymers with polyethylene, maleic anhydride/acrylic acid graft copolymers with polypropylene; and polyamide films; and a pressure-sensitive adhesive, wherein the outer surface layer forms a first major surface of the tape and the adhesive layer forms a second major surface of the tape;

conforming the tape to the surface so that the tape is essentially free from wrinkles, air bubbles and other discontinuities in the bond between the tape and the lens blank; and applying a lens block to at least a portion of the polymer backing layer of the tape.

20. The method according to claim 19, wherein the outer surface layer comprises a polymer composition selected from the group consisting of a blend of an olefin polymer and an polymer having acidic functionality, and a copolymer of an olefin monomer with an acid functional monomer.

21. The method according to claim 19, wherein the outer surface layer comprises a blend of an olefin polymer selected from the group consisting of polyethylene, polypropylene, polybutylene, copolymers of ethylene with octene, chlorinated polyethylene, copolymers of ethylene with vinyl acetate, copolymers of ethylene with ethyl acrylate, and olefinic ionomer resins and a polymer having acidic functionality selected from the group consisting of copolymers of an olefin monomer and acrylic acid, and copolymers of an olefin monomer and methacrylic acid, wherein the blend comprises between 25 and 85 weight percent of the acidic functional polymer.

22. The method according to claim 19, wherein the outer surface layer comprises a copolymer of an olefin monomer selected from the group consisting of substituted and unsubstituted ethylene, propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, and 1-isodecene with an acid functional monomer selected from the group consisting of acrylic acid, and methacrylic acid.

23. The method according to claim 19, wherein the tape has stress retention value less than 70%.

24. The method according to claim 19, wherein the tape may be wound into a roll without a separate liner and exhibit acceptable unwind forces when aged in the wound form.

* * * * *

UNITED STATES PATENT AND TRADEMARK OFFICE
CERTIFICATE OF CORRECTION

PATENT NO. : 6,149,750
DATED : November 21, 2000
INVENTOR(S) : William L. Parish, Jr. Phillip G. Martin, Partrick D. Hyde Page 1 of 1

It is certified that error appears in the above-identified patent and that said Letters Patent is hereby corrected as shown below:

Column 10,
Line 14, "~0.5 dl/g" should read -- ~5 dl/g --.

Column 46,
Line 43, -- "ATTAME" should read -- ATTANE --.

Signed and Sealed this

Twenty-third Day of April, 2002

Attest:

JAMES E. ROGAN
Director of the United States Patent and Trademark Office

Attesting Officer